United States Patent
Sato et al.

(10) Patent No.: US 7,898,233 B2
(45) Date of Patent: Mar. 1, 2011

(54) MULTIPHASE VOLTAGE REGULATORS AND METHODS FOR VOLTAGE REGULATION

(75) Inventors: Tetsuo Sato, San Jose, CA (US);
Masato Ono, Cupertino, CA (US);
Ryotaro Kudo, Takasaki (JP)

(73) Assignee: Renesas Electronics America Inc., Santa Clara, CA (US)

( * ) Notice: Subject to any disclaimer, the term of this patent is extended or adjusted under 35 U.S.C. 154(b) by 236 days.

(21) Appl. No.: 12/101,665

(22) Filed: Apr. 11, 2008

(65) Prior Publication Data
US 2009/0256537 A1  Oct. 15, 2009

(51) Int. Cl.
*G05F 1/40* (2006.01)
(52) U.S. Cl. .......................................................... 323/283
(58) Field of Classification Search .......... 323/222–225, 323/268, 271, 272, 282, 283, 285; 363/65
See application file for complete search history.

(56) References Cited

U.S. PATENT DOCUMENTS

| | | | | |
|---|---|---|---|---|
| 6,583,610 B2 * | 6/2003 | Groom et al. | | 323/288 |
| 6,670,794 B1 * | 12/2003 | Wang et al. | | 323/213 |
| 6,674,274 B2 * | 1/2004 | Hobrecht et al. | | 323/285 |
| 7,026,798 B2 * | 4/2006 | Cheung et al. | | 323/225 |
| 7,592,787 B2 * | 9/2009 | Qui et al. | | 323/272 |
| 2010/0033151 A1 * | 2/2010 | Wu et al. | | 323/285 |

* cited by examiner

Primary Examiner — Matthew V Nguyen
(74) Attorney, Agent, or Firm — Squire, Sanders & Dempsey (US) LLP

(57) ABSTRACT

A multiphase voltage regulator system comprises a microcontroller unit (MCU) including a reference voltage generator, and a timing generator for generating n-phase start timing signals; a load for receiving an output voltage; a comparator comparing the reference voltage and output voltage to generate a comparison result; and at least n points of load (POLs) coupled between the MCU and load for controlling output voltage in response to the n-phase start timing signals and the comparison result. Each POL may include a high-side and low-side transistor; and a D-FlipFlop, the D terminal coupled High, the clock terminal coupled to receive a control signal based on a respective one of the n-phase start timing signals, the Q terminal coupled to drive the high-side transistor, the /Q terminal coupled to drive the low-side transistor, and the reset terminal coupled to receive a reset control signal based on the comparison result.

32 Claims, 23 Drawing Sheets

US 7,898,233 B2

MULTIPHASE VOLTAGE REGULATORS AND METHODS FOR VOLTAGE REGULATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to voltage regulators, and more particularly provides a multiphase voltage regulator and methods for voltage regulation.

BACKGROUND

A voltage regulator is an electrical circuit that maintains a constant voltage. Voltage regulators require high efficiency and reliability during full load and light load conditions. FIG. 1 illustrates a prior art multiphase voltage regulator 10. Multiphase voltage regulator 10 includes a microcontroller unit (MCU) 100 coupled to the main MCU 114 and to a pulse width modulation (PWM) integrated circuit (IC) 102 in turn coupled to a set of n current-drivers 104 (104a-104n). Each of the n current-drivers 104 includes a voltage driver D (Da-Dn) controlling high-side (HS) and low-side (LS) MOSFETs (HSa/LSa-HSn/LSn), which drives an inductor L (La-Ln). Each of the inductors L are tied together to drive a capacitor C and load 116 coupled in parallel. The PWM IC 102 includes an oscillator 106, data I/O and a reference voltage (Vref) circuit 108, and an analog comparator 110, each coupled to PWM control logic 112.

FIG. 2 illustrates prior art multiphase PWM waves generated by the PWM IC 102. The PWM waves are phase shifted by $2\pi/n$ (n being phase number). In the 6-phase case, the PWM waves are phase shifted by $2\pi/6$ or 60 degrees. The 6-phase case achieves a fixed Vout, and controls the PWM duty to Vout/Vcc. If Vcc=12V and Vout=1.2V, then the PWM duty is 10%. Each PWM wave drives a respective current-driver 104, causing it to source a current with a respective phase corresponding to the PWM wave. That is, when the PWM wave is High, the corresponding HS MOSFET turns ON and the corresponding LS MOSFET turns OFF. Current flows from Vcc through the inductor L to the load 116. Ldi/dt1=Vcc−Vout. When the PWM wave is Low, the corresponding HS MOSFET turns OFF and the corresponding LS MOSFET turns ON. The current flows from GND through the inductor L to the load 116. Ldi/dt2=Vout. Hence, the duty=Vout/Vcc=dt1/(dt1+dt2).

The prior art voltage regulator 10 uses a hardware-designed PWM IC 102 to control output current. Accordingly, adaptive control is difficult. For example, changing the number of phases requires switching out the PWM IC 102 and possibly changing the entire design, which is inconvenient and costly.

SUMMARY

In accordance with one embodiment, the present invention provides a multiphase voltage regulator system, comprising a microcontroller unit (MCU) including a digital to analog converter (DAC) for generating a reference voltage, and a timing generator for generating n-phase start timing signals; a load for receiving an output voltage; a comparator for comparing the reference voltage and the output voltage to generate a comparison result; and at least n points of load (POLs) coupled between the MCU and the load for controlling the output voltage in response to the n-phase start timing signals and the comparison result.

For the system, each POL may include a high-side transistor, a low-side transistor, and a driver for driving the transistors. The driver may include a D-FlipFlop, the D terminal coupled High, the clock terminal coupled to receive a control signal based on a respective one of the n-phase start timing signals, the Q terminal coupled to drive the high-side transistor, the /Q terminal coupled to drive the low-side transistor, and the reset terminal coupled to receive a reset control signal based on the comparison result. Each POL may include enable circuitry to deactivate and isolate the POL. The MCU may include an enable line coupled to the enable circuitry to control activation of each POL. The timing generator may change the phase of the n-phase start timing signals and may maintain the cycle time of the n-phase start timing signals constant regardless of the number of active phases. The timing generator may change the phase of the n-phase start timing signals and may modify the cycle time of the n-phase start timing signals based on the number of active phases. The DAC may change the reference voltage in steps. The MCU may further include a second DAC for generating a second reference voltage, the MCU being capable of generating y-phase start timing signals. The system may further include a second load for receiving a second output voltage; a second comparator for comparing the second reference voltage and the second output voltage to generate a second comparison result; and at least y second points of load coupled between the MCU and the second load for controlling the second output voltage in response to the y-phase start timing signals and the second comparison result. The MCU may include an analog to digital converter (ADC) to detect output current. The MCU may include an analog to digital converter (ADC) to detect load temperature.

In accordance with one embodiment, the present invention may provide a multiphase voltage regulator system, comprising a load for receiving an output voltage; an MCU including a register for storing a digital reference voltage value, an analog to digital converter (ADC) for converting the output voltage to a digital output voltage value, a digital comparator for comparing the digital reference voltage value and the digital output voltage value to generate a comparison result, and a timing generator for generating n-phase start timing signals; and at least n points of load coupled between the MCU and the load for controlling the output voltage in response to the n-phase start timing signals and the comparison result.

For this system, the reference register may be operative to modify the reference voltage value in steps. The system may further include a second load for receiving a second output voltage. The MCU may further include a second digital reference voltage value; a second ADC for converting the second output voltage to a second digital output voltage value; a second digital comparator for comparing the second digital reference voltage value and the second digital output voltage value to generate a second comparison result; and a second timing generator for generating y-phase start timing signals. The system may further include at least y second points of load coupled between the microcontroller unit and the second load for controlling the second output voltage in response to the y-phase start timing signals and the second comparison result. The MCU may include an analog to digital converter (ADC) to detect output current. The MCU may include an analog to digital converter (ADC) to detect load temperature.

In accordance with one embodiment, the present invention may provide a method comprising generating a reference voltage with an MCU; generating n-phase start timing signals with the MCU; receiving an output voltage at a load; comparing the reference voltage and the output voltage to generate a comparison result; using the n-phase start timing signals to drive n points of load (POLs) in a phase-shifted manner, each POL driving the output voltage in a first direction based on the n-phase start timing signals; and using the comparison result to drive the n POLs in a phase-shifted manner, each POL driving the output voltage in a second direction based on the comparison result, thereby generating a multiphase voltage-regulated signal to control the output voltage.

For the method, the method may further comprise enabling n POLs; and disabling at least one POL. The phase shift may be approximately $2\pi/n$. The first direction may include upward and the second direction may include downward. The reference voltage may be generated using a digital to analog converter (DAC). The n-phase start timing signals may be generated using a counter.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

Figure 1:
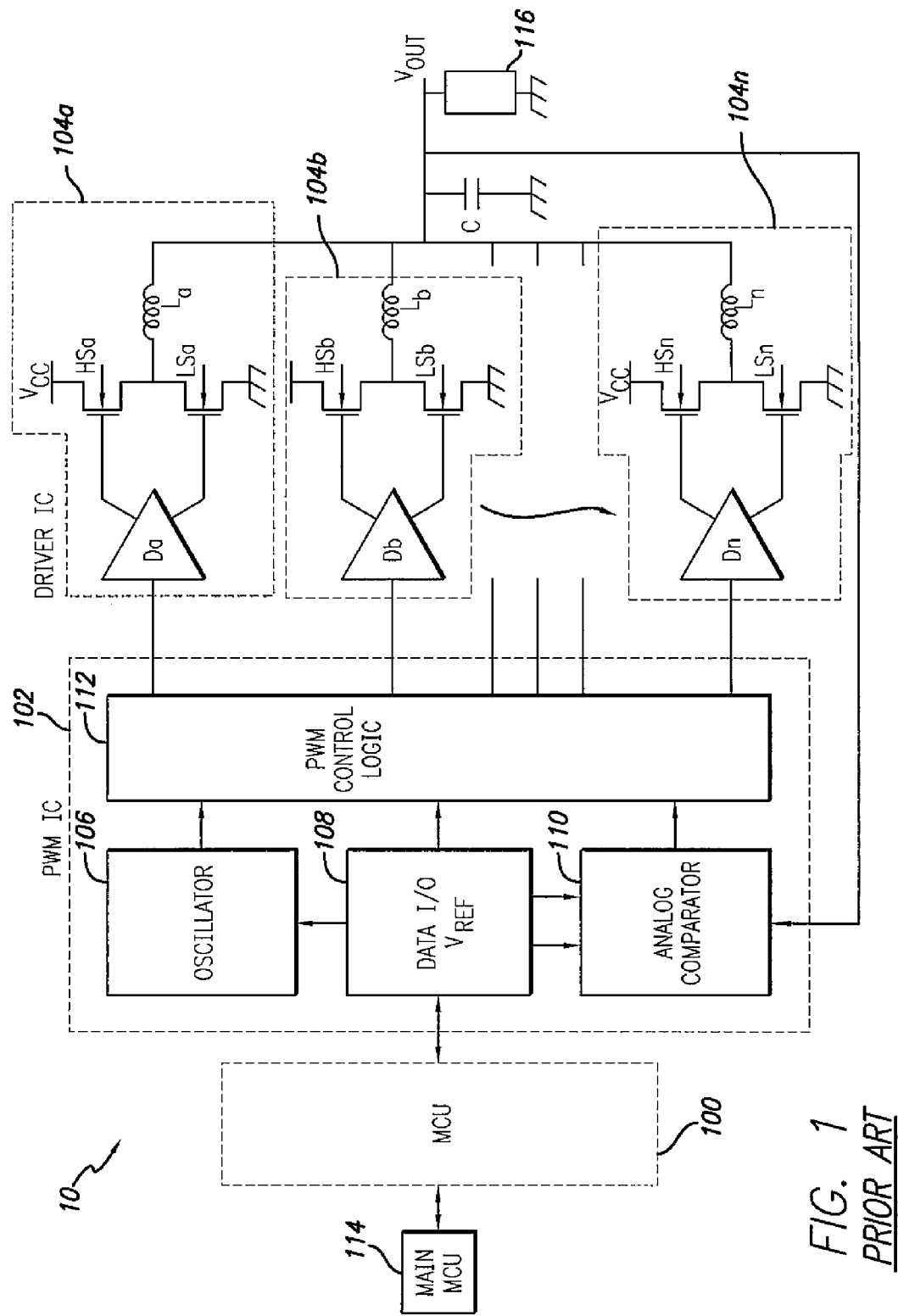
FIG. 1 is a block diagram illustrating a prior art multiphase voltage regulator with an MCU interface.
Figure 2:
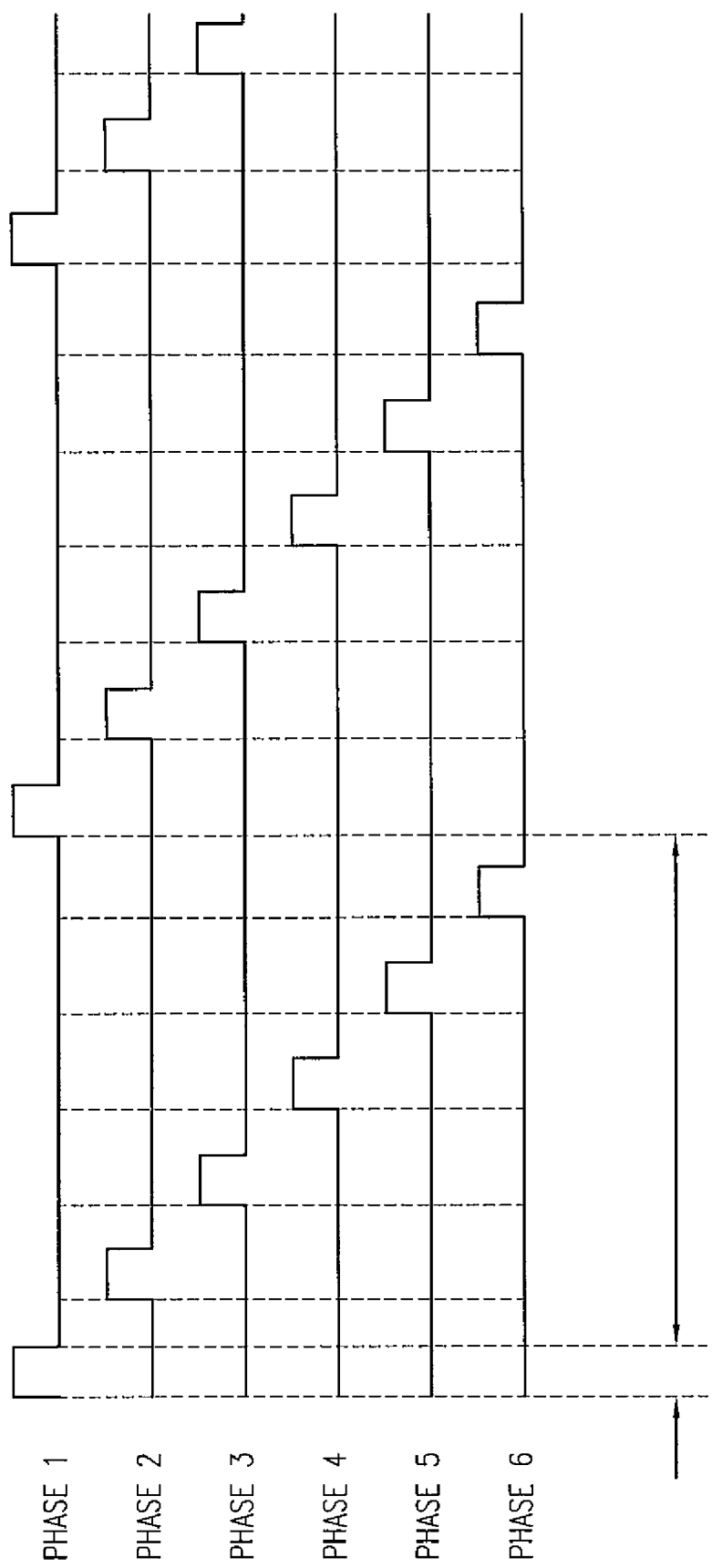
FIG. 2 is a timing chart that illustrates prior art PWM waves driven by the PWM IC.
Figure 3:
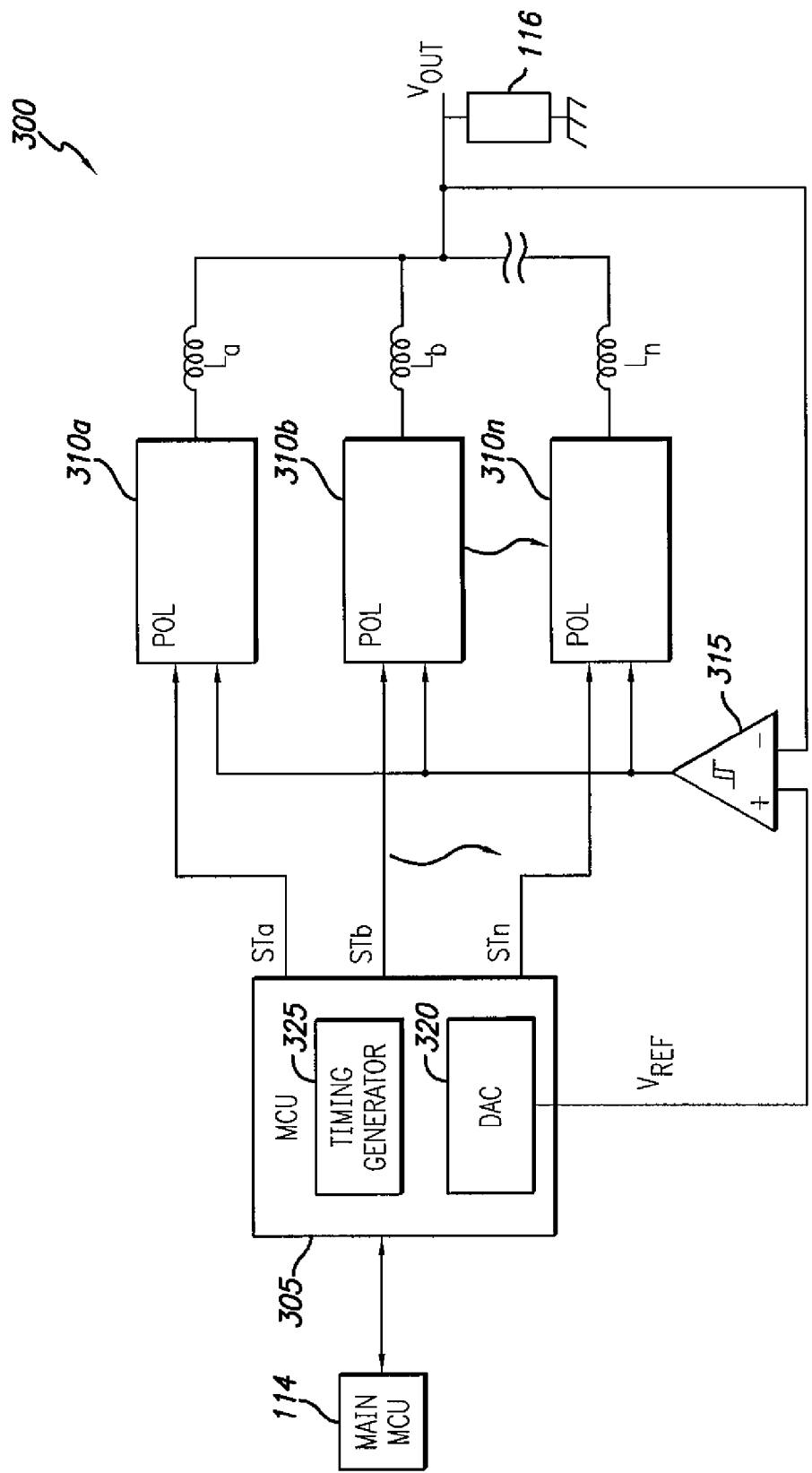
FIG. 3 is a block diagram illustrating a multiphase voltage regulator, in accordance with an embodiment of the present invention.

FIG. 3 is a block diagram illustrating a multiphase voltage regulator 300, in accordance with an embodiment of the present invention. The multiphase voltage regulator 300 includes a microcontroller unit (MCU) 305 coupled to a set of self-standing point of load integrated circuits (POLs) 310 (310*a*-310*n*), each driving an inductor L (La-Ln). The inductors L are tied together and drive a load 116. In one embodiment, each POL 310 operates as a self-standing dc-dc converter to control the output voltage. A comparator 315 (possibly with hysteresis) compares the output voltage and a voltage reference (Vref) signal from the MCU 305 to generate a comparison result, the comparison result being used as input to the POLs 310. The comparator may be any suitable type of comparator used for comparing two signals and providing a comparison result, such as a conventional comparator, a comparison amplifier, a subtraction amplifier, and the like. In one embodiment, the MCU 305 includes a built-in digital to analog converter (DAC) 320 to generate Vref, and a timing generator 325 to provide POL start timing. In one embodiment, the DAC 320 changes in steps. In one embodiment, the POL start timing is phase shifted for each POL by $2\pi/n$ (n being the phase number). The MCU 305 also operates as an interface to the main MCU 114 to monitor various conditions and enable adaptive control, e.g., by controlling Vref and the start timing signals.

The MCU 305 generates enable control signals to activate/deactivate the POLs 310. Each enable control signal connects to a POL On/Off terminal. In one embodiment, when an enable control signal is High, its POL 310 is active. Each start timing signal connects to a POL sync terminal. In one embodiment, when the start timing signal transitions from High to Low, the POL 310 turns On until the output voltage reaches Vref. Once Vref is reached, the POL turns Off until next trigger returns.

In one embodiment, the multiphase voltage regulator 300 includes n, e.g., six, POLs 310 with outputs connected together, working to source current to the load equally. In the 6-phase case, the multiphase voltage regulator 300 may use Vin=12V, Vout=1.6~0.5V, Io=180 A (total), and f(PWM)= 500 KHz/ch. At system start, Vin may be set to 12V, Vin to 5.0V, Vin MCU to 5V. All enable and start timing control signals are set to High. Then, all phase control signals transition from High to Low synchronously. Start mode operates to turn every POL 310*n* at the same time to charge the output capacitors. Approximately 1/f(PWM) or 2 μsec later, the next negative edge feeds into the phase 1 node. Approximately ⅙×fPWM or 333 nsec later, the negative edge feeds into the phase 2 node. Approximately 333 nsec later, another negative edge feeds into the phase 3 node. The process repeats in same manner through phase 6. Then, the process returns back to phase 1. This process continues until the output voltage reaches Vref.

Regarding phase down, to achieve high efficiency in light load conditions, phase down function is useful. The voltage regulator 300 enables constant PWM frequency (when the phase number changes, f(PWM) is constant and phase shift timing is variable); constant ripple (when the phase number changes, f(PWM) is variable and phase shift timing is constant); or something in between (when the phase number changes, f(PWM) and phase shift timing is variable).

When a designer needs to add additional phases, there is no need to change the base design. One needs only to add a POL and modify the MCU firmware.

Figure 4:
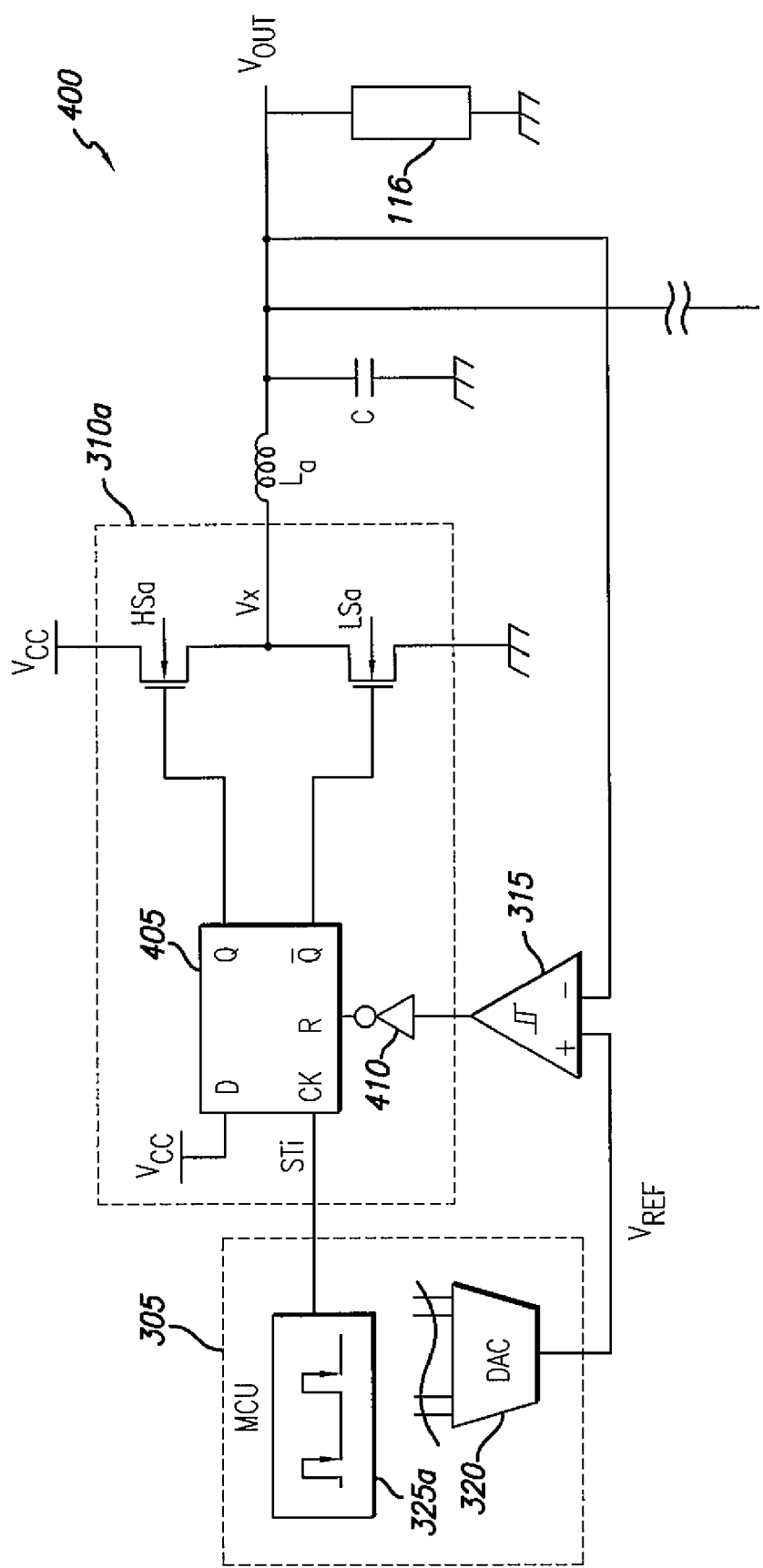
FIG. 4 is a block diagram illustrating details of the MCU and one point of load of FIG. 3, in accordance with an embodiment of the present invention.

FIG. 4 is a block diagram illustrating details of a portion 400 of the multiphase voltage regulator 300, in accordance with an embodiment of the present invention. The portion 400 includes the MCU 305, the POL 310a coupled to the MCU 305, the inductor La coupled to the POL 310a, capacitor C and load 116 coupled in parallel to the inductor La, and the comparator 315 coupled to the MCU 305 and to Vout. The MCU 305 includes a timing generator 325a to generate POL start timing signals and a DAC 320 to generate Vref for the analog comparator 315. The POL 310a includes high-side n-channel MOSFET HSa, low-side n-channel MOSFET LSa, and start-and-stop logic, e.g., a D-FlipFlop 405, operative to drive HSa and LSa according to the timing signals. The D-FlipFlop 405 includes a D terminal coupled to VCC, a negative-edge-triggered clock terminal coupled to receive the start timing signal from the timing generator 325a, a Q output terminal coupled to drive HSa, and a /Q output terminal coupled to drive LSa. The D-FlipFlop 405 further includes a reset terminal R coupled to an inverter 420, which receives the output signal of the comparator 315.

HSa and LSa alternate On/Off and work as a non-isolated back converter. More particularly, as the negative edge of a first pulse (phase 1) reaches the negative edge triggered clock input terminal of the D-FlipFlop 405, the Q output terminal goes High and the /Q output terminal goes Low. The HSa turns On and the LSa turns Off, causing current to flow from VCC through inductor La into capacitor C and load 116. When Vout reaches Vref, the comparator 315 and inverter 410 combination generate a reset signal to the reset terminal R, thereby causing the D-FlipFlop 405 to reset. The HSa turns Off and the LSa turns On, causing current to flow from ground through inductor La into capacitor C and load 116. The process for POL 310a repeats for each pulse of phase 1.

Figure 5:
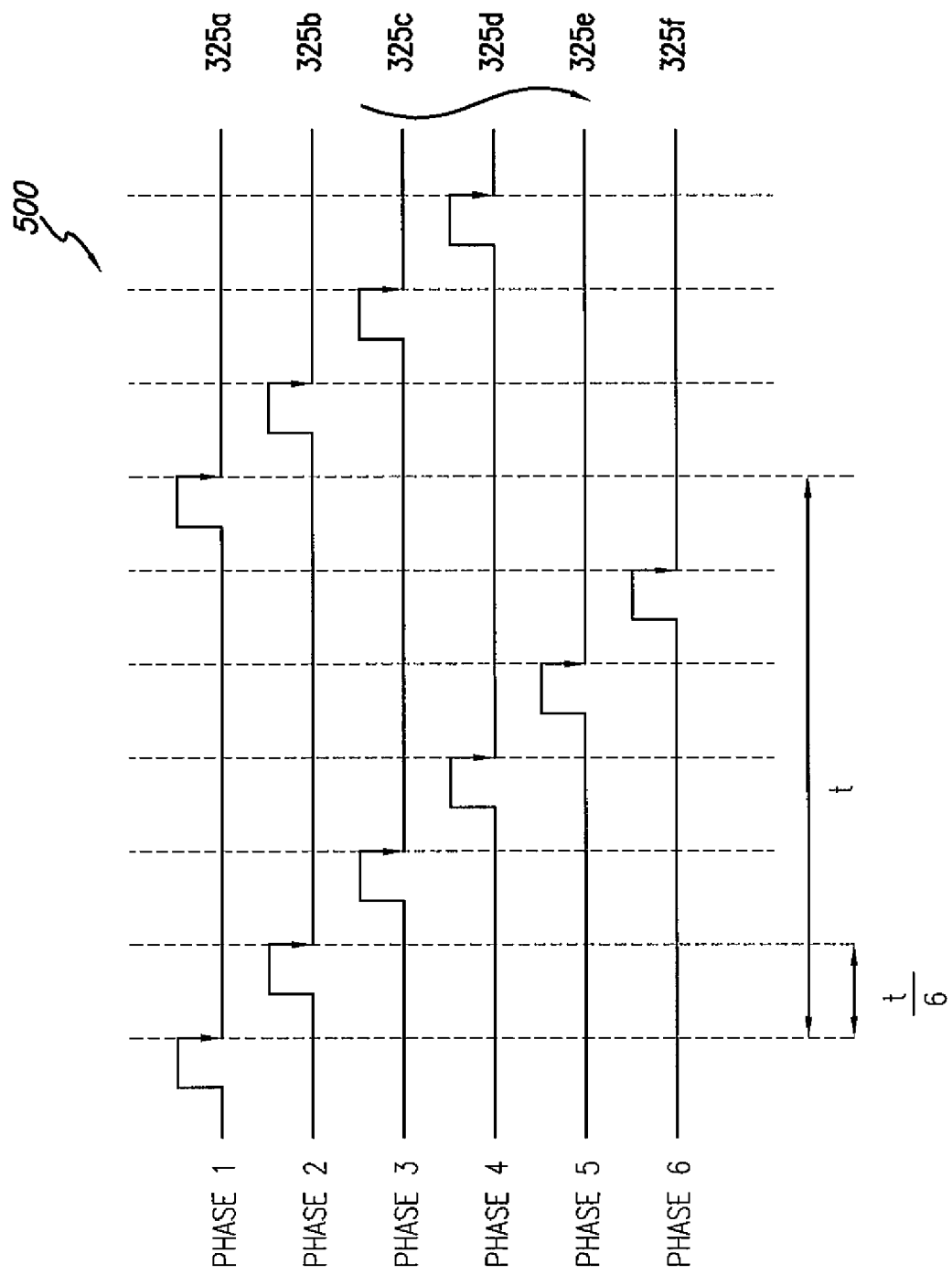
FIG. 5 is a timing chart that illustrates start timing signals for a 6-phase voltage regulator, in accordance with an embodiment of the present invention.

Each POL 310 may include similar circuitry as described with reference to portion 400. Accordingly, the process for each respective POL 310 may be substantially the same (except for its respective phase shift). For example, in one embodiment, the POL 310b operates in response to start timing signals of phase 2, POL 310c operates in response to start timing signals of phase 3, POL 310d operates in response to start timing signals of phase 4, POL 310e operates in response to start timing signals of phase 5, and POL 310f operates in response to start timing signals of phase 6. FIG. 5 illustrates start timing signals 500 for a 6-phase voltage regulator, which has a cycle time of "t" or 2π and phase shifting of "t/6" or 2π/6. In one embodiment, "t" is selected as between about 1 μsec and about 0.1 μsec.

Figure 6:
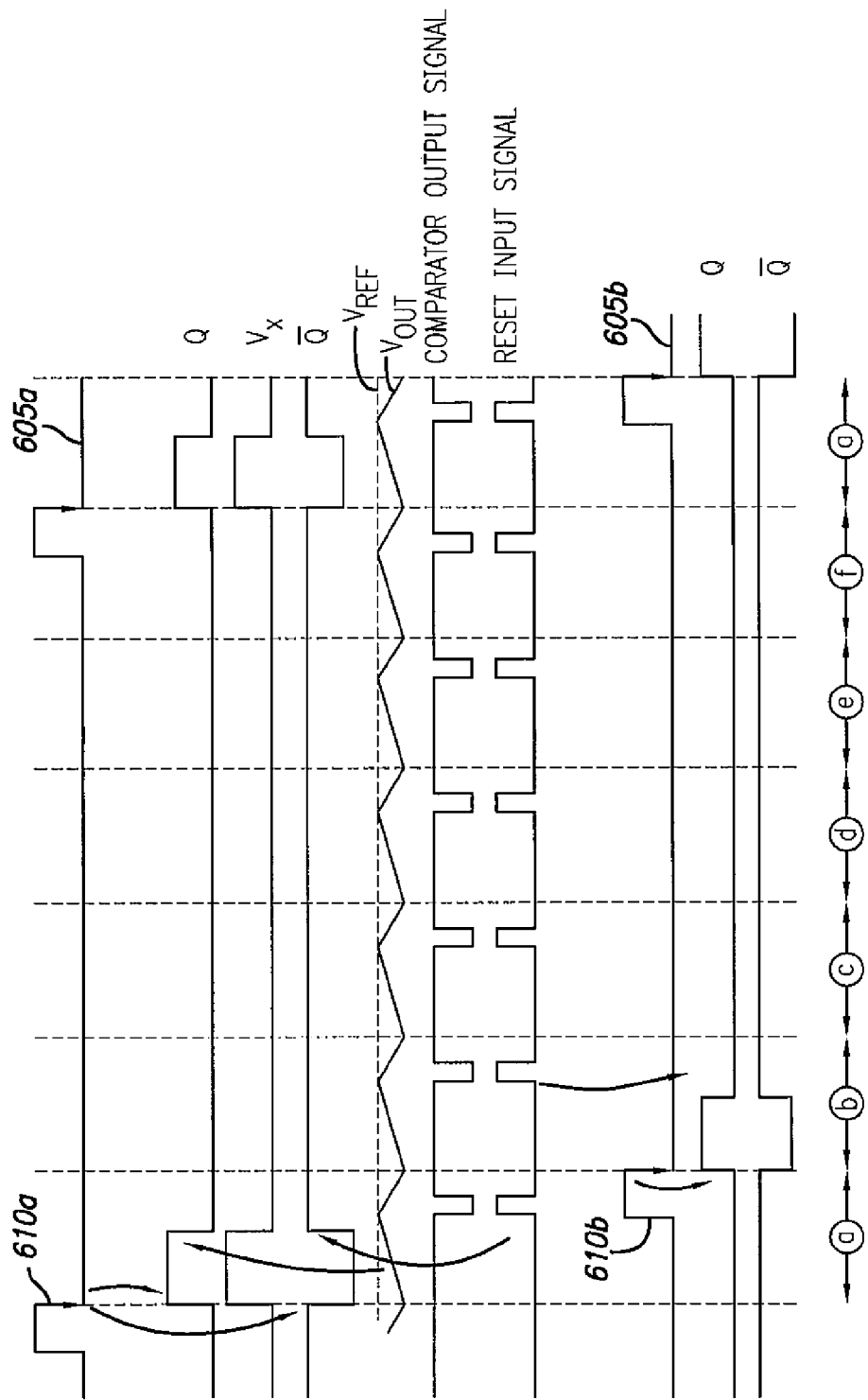
FIG. 6 is a timing chart that illustrates output signals generated by the multiphase voltage regulator of FIG. 3 in response the start timing signals of FIG. 5, in accordance with an embodiment of the present invention.

FIG. 6 illustrates output signals generated by the multiphase voltage regulator 300 in response the start timing signals 500, in accordance with an embodiment of the present invention. The timing generator 325a generates start timing signal 605a (phase 1). Referring to the first time segment a, the negative edge of a first pulse 610a of the start timing signal 605 causes the Q output terminal of the D-FlipFlop 405 to go High and the /Q output terminal to go Low. HSa turns On and LSa turns Off. The voltage at the node Vx between HSa and LSa raises to Vcc. Current "i" flows from Vcc to inductor La to output capacitor C and load 116. di/dt=(Vcc−Vout)/L. Vout gradually increases to Vref (see Vout during first half of time segment a). When Vout reaches Vref, the output signal of the analog comparator 315 changes to Low. The output signal of the inverter 410 changes to High, which causes the D-Flip-Flop 405 to Reset. The Q output terminal goes Low, and the /Q output terminal goes High. HSa turns Off and LSa turns ON. The current "i" flows from GND to inductor L to capacitor C and load 116. Vout gradually decreases (see second half of time segment a), until the next pulse arrives (in this case due to pulse 610b). Duty=Vout/Vcc=dt1/(dt1+dt2).

The process repeats for each POL 310. Namely, Vout gradually increases and decreases for each phase, as controlled by each POL 310, as shown in each time segment a-f. Then, the process repeats.

Figure 7:
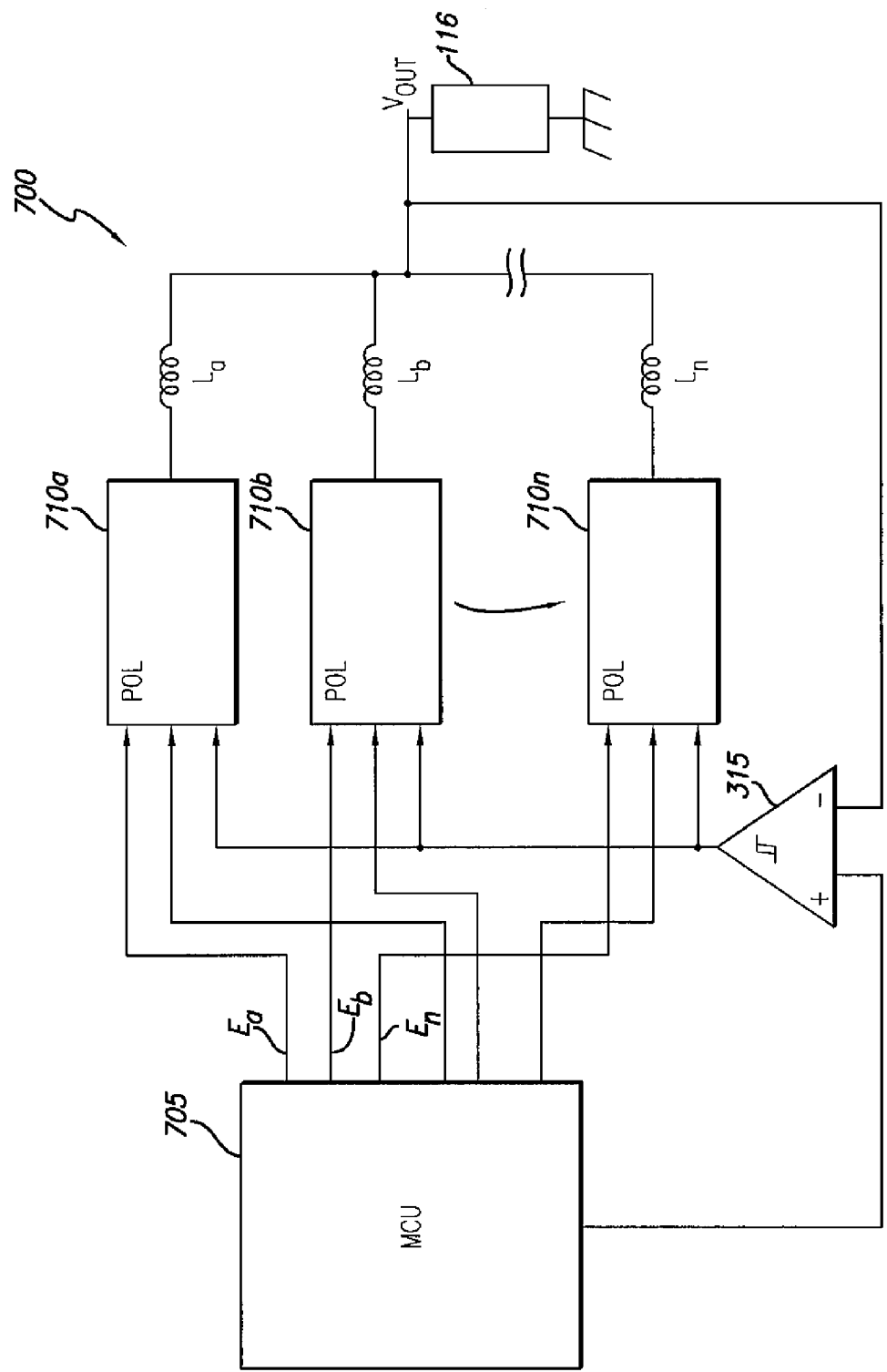
FIG. 7 is a block diagram of a multiphase voltage regulator with an enable function, in accordance with an embodiment of the present invention.

FIG. 7 is a block diagram of a multiphase voltage regulator 700 with an enable function, in accordance with an embodiment of the present invention. The multiphase voltage regulator 700 includes similar elements and operates similarly to the multiphase voltage regulator 300 of FIG. 3. However, multiphase voltage regulator 700 includes an enable control line E (Ea-En) from MCU 705 to each POL 710 (710a-710n). Each enable control line E allows activation and deactivation of each POL 710 to effectively control the number of active phases.

Figure 8:
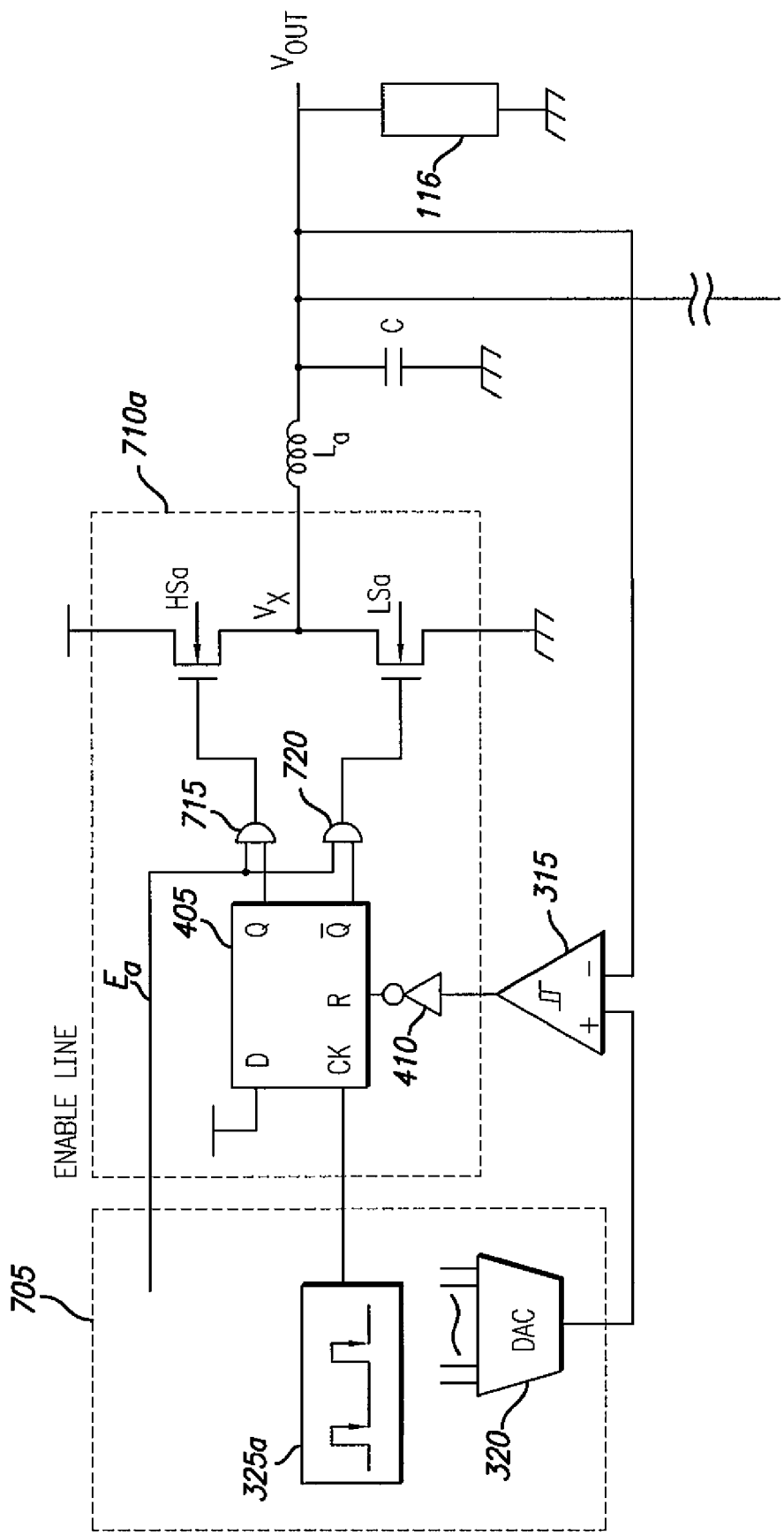
FIG. 8 is a block diagram illustrating details of the MCU and one point of load of FIG. 7, in accordance with an embodiment of the present invention.

FIG. 8 is a block diagram illustrating details of a portion 800 of the multiphase voltage regulator 700, in accordance with an embodiment of the present invention. In one embodiment, the portion 800 includes the components of portion 400 with an AND gate 715 coupled between the Q output terminal of the D-FlipFlop 405 and the HSa, and an AND gate 720 coupled between the /Q output terminal of the D-Flip Flop 405 and the LSa. The second input to each AND gate 715/720 is coupled to the enable line Ea to the MCU 705. Accordingly, in this embodiment, the enable line is active High. When enabled, the portion 800 operates like the portion 400. When not enabled, HSa and LSa are both Off, and Vx floats (isolating the circuit).

Figure 9:
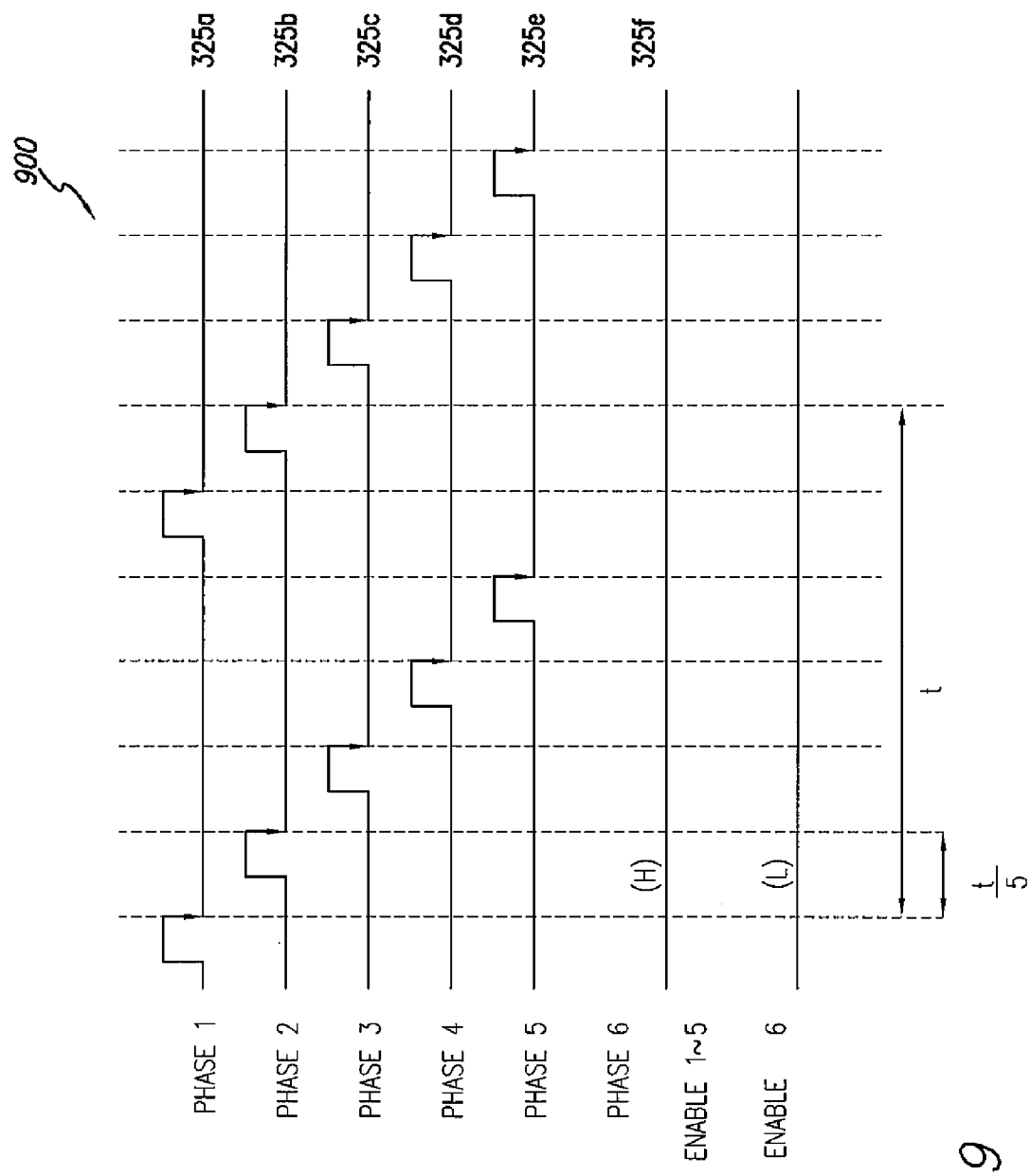
FIG. 9 is a timing chart that illustrates start timing and enable control signals for a 5-phase voltage regulator, in accordance with an embodiment of the present invention.

FIG. 9 illustrates start timing and enable control signals 900 for the multiphase voltage regulator 700, configured for a 5-phase case, in accordance with an embodiment of the present invention. As shown, POLs 310a-310e are enabled, and the start timing signals for POLs 310a-310e are shifted by 2π/5. POL 310f is disabled. Accordingly, using Enable lines, a 6-phase multiphase voltage regulator 700 can be operated in a 5-phase mode. The phase shift timing is changed from "t/6" to "t/5" (or 2π/5). In one embodiment, the cycle time "t" remains constant. In one embodiment, the cycle time "t" changes, e.g., is lengthened.

Figure 10:
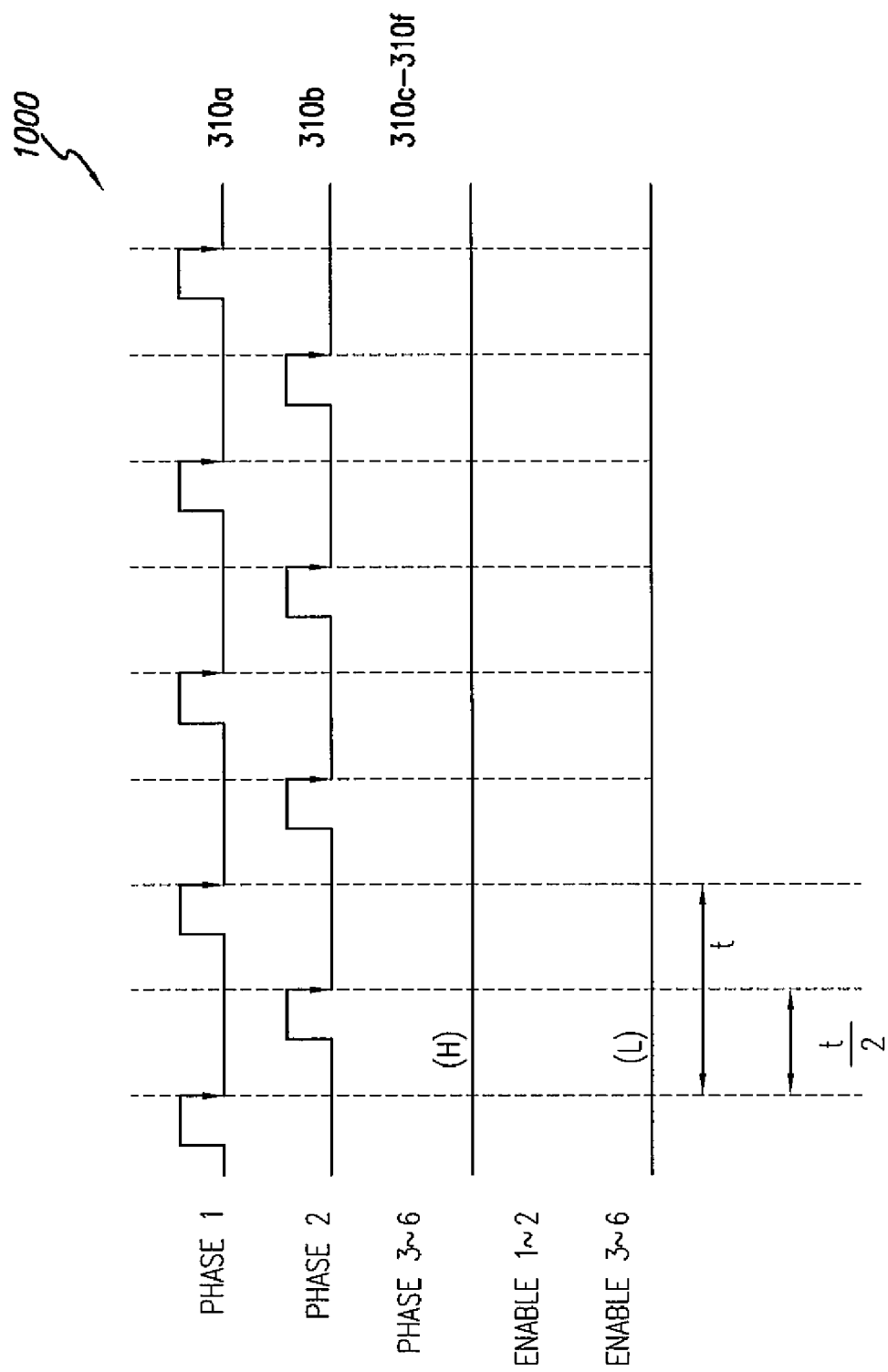
FIG. 10 is a timing chart that illustrates start timing and enable control signals for a 2-phase voltage regulator, in accordance with an embodiment of the present invention.

FIG. 10 illustrates start timing and enable control signals 1000 for the multiphase voltage regulator 700, configured for a 2-phase case, in accordance with an embodiment of the present invention. As shown, POLs 310a-310b are enabled, and the start timing signals for POLs 310a-310b are shifted by 2π/5. POLs 310c-310f are disabled. Accordingly, using the enable lines, a 6-phase multiphase voltage regulator 700 can be operated in a 2-phase mode.

Figure 11:
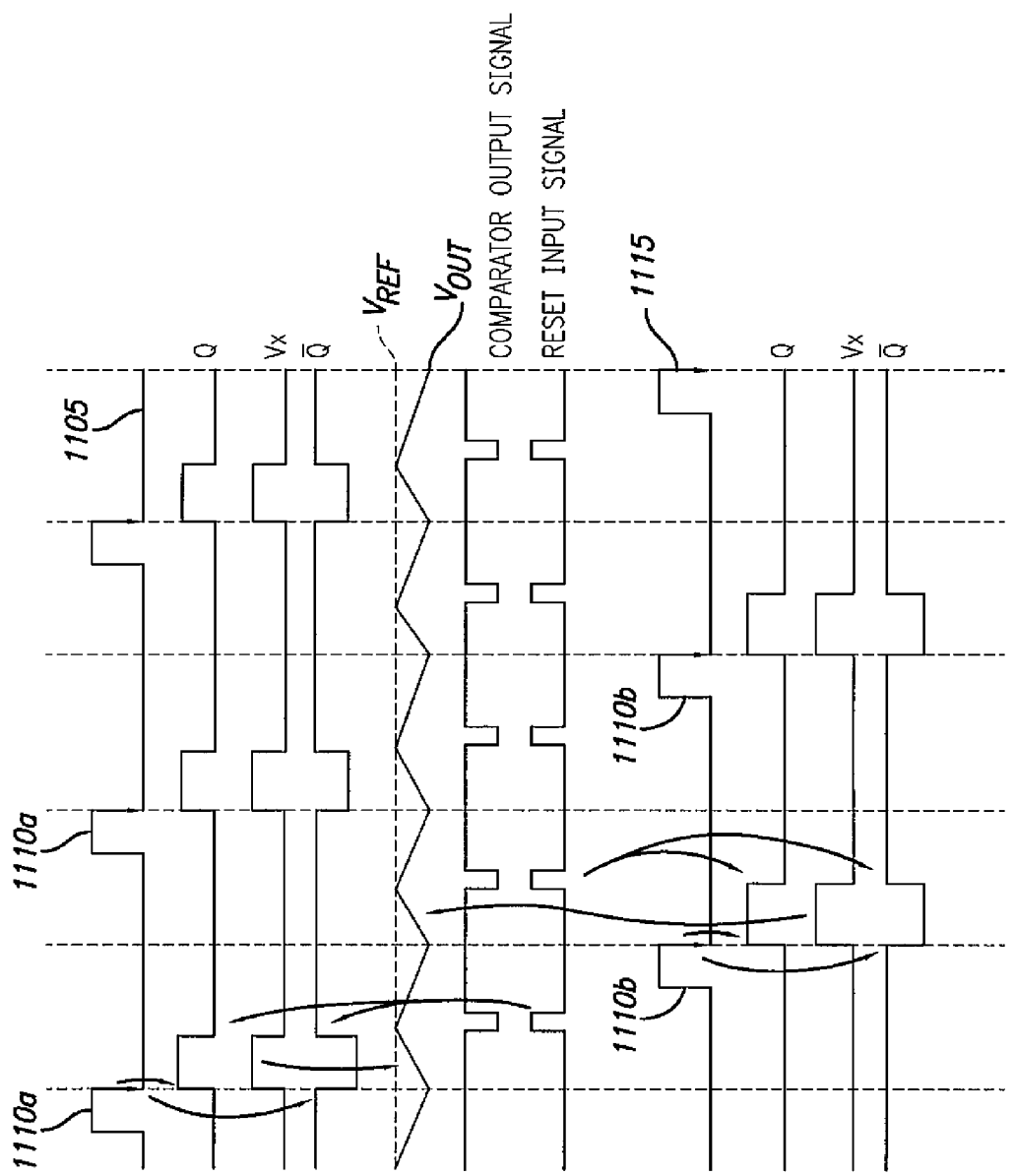
FIG. 11 is a timing chart that illustrates output signals generated by the multiphase voltage regulator of FIG. 8 in response the 2-phase start timing signals of FIG. 10, in accordance with an embodiment of the present invention.

FIG. 11 illustrates output signals generated by the multiphase voltage regulator 700 in response the 2-phase start timing signals 1000, in accordance with an embodiment of the present invention. The output signals operate in a similar manner to the output signals of FIG. 6. However, the timing between pulses 1110a of phase 1 and between pulses 1110b of phase 2 are based on the 2-phase case, namely, $2\pi/2$ (instead of $2\pi/6$).

Figure 12:
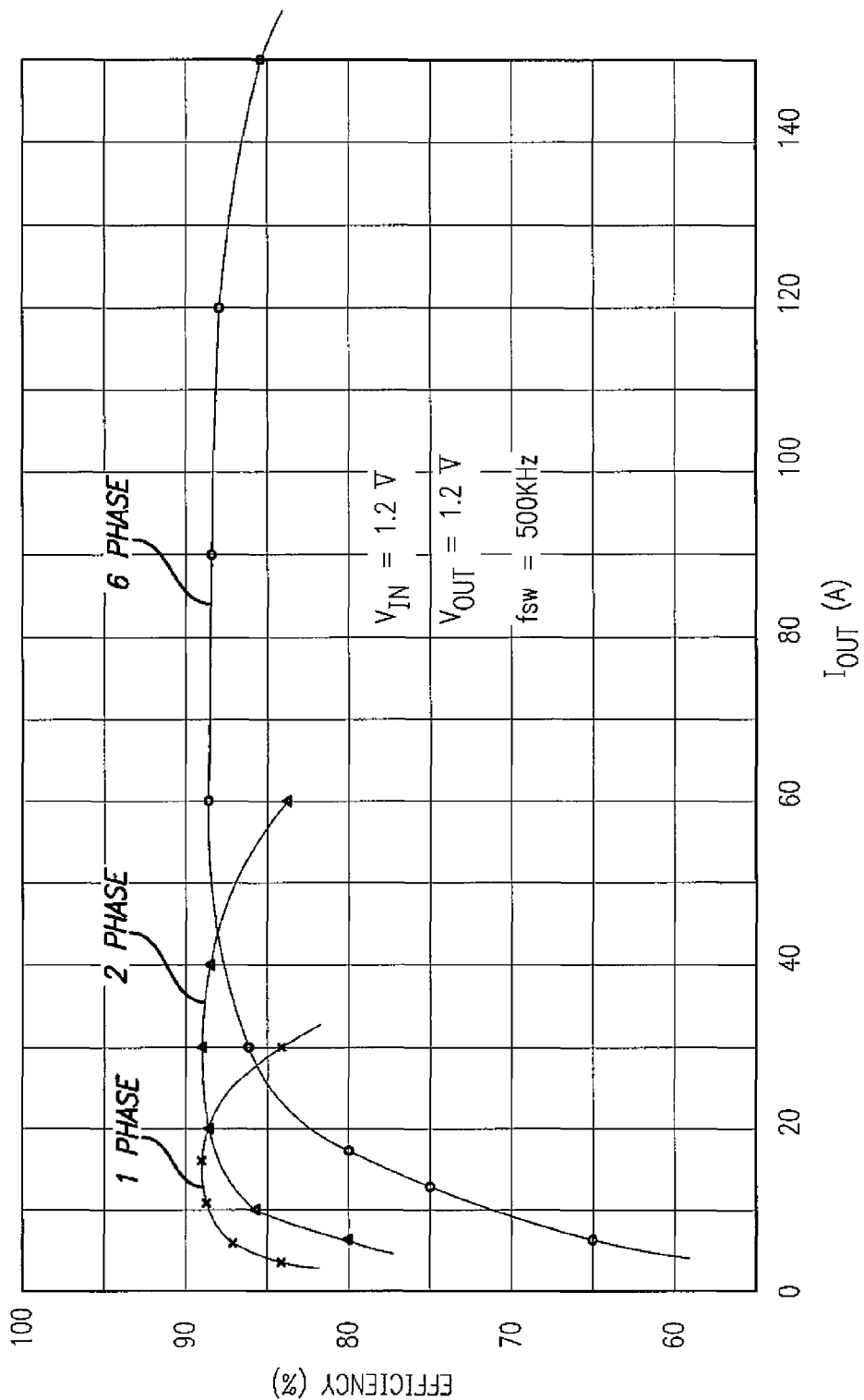
FIG. 12 is a graph illustrating efficiency versus current output for a 1-phase, 2-phase, and 6-phase cases, in accordance with an embodiment of the present invention.

FIG. 12 is a graph showing the efficiency (%) of various multiphase cases (for Vcc=12V, Vout=1.2V, fsw=500 KHz, t=0.2 μsec, L=0.44 μH) relative to the output current Iout. In one embodiment, efficiency=1.2V*Ioutput/12V*Iinput. In the 6-phase case, the multiphase voltage regulator 700 is at least 85% efficient from about 30 A to about 150 A. However, efficiency of the multiphase voltage regulator 700 degrades substantially for light load conditions lower than about 30 A. In server application, the multiphase voltage regulator 700 must be efficient during high current operations and light load operations, e.g., sleep mode. In the 2-phase case, the multiphase voltage regulator 700 is at least 85% efficient from about 10 A to about 50 A. In the 1-phase case, the multiphase voltage regulator 700 is at least 85% efficient from about 5 A to about 25 A. Accordingly, the MCU 705 can be configured to switch between various phase cases based on the load conditions, to achieve improved efficiency from 5 A to about 150 A.

Figure 13:
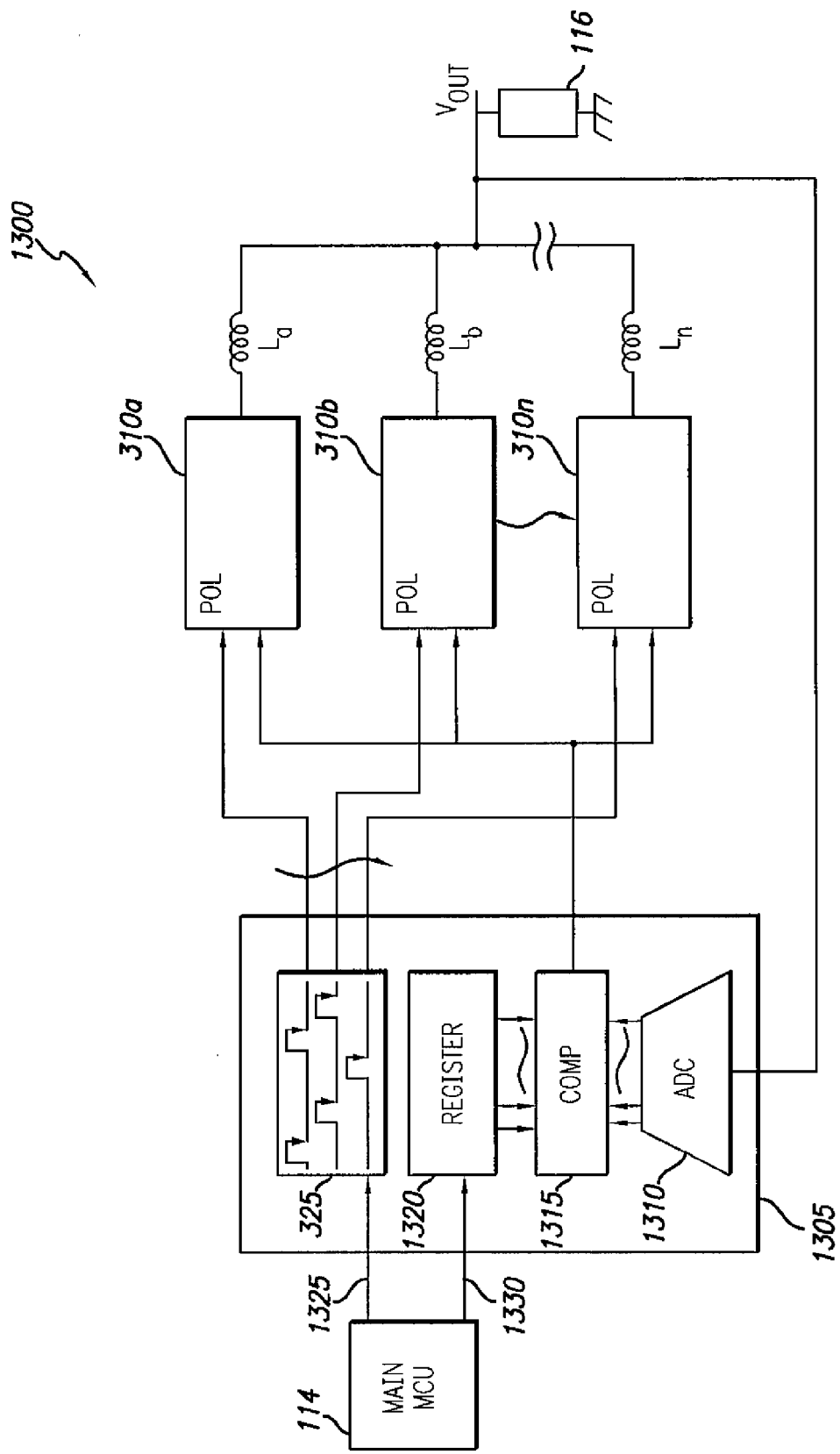
FIG. 13 is a block diagram of a multiphase voltage regulator with a digital comparator system instead of analog comparator, in accordance with an embodiment of the present invention.

FIG. 13 is a block diagram of a multiphase voltage regulator 1300 with a digital comparator system 1315 in the MCU 1305 instead of analog comparator 315, in accordance with an embodiment of the present invention. In this case, MCU 1305 includes an analog-to-digital converter (ADC) 1310, which receives Vout and converts it to a digital value Voutd. The MCU 1305 further includes a register 1320, which receives a digital reference voltage signal Vrefd from the main MCU 114. The register 1320 may be operative to store and modify the value in steps. The MCU further includes a digital comparator 1315, which compares the Vrefd signal and the Voutd signal to generate the reset signals for the POLs 310. In this embodiment, the main MCU 114 also provides start timing control signals 1325 to timing generator 325 to generate the start timing signals that control the POLs 310.

Figure 14:
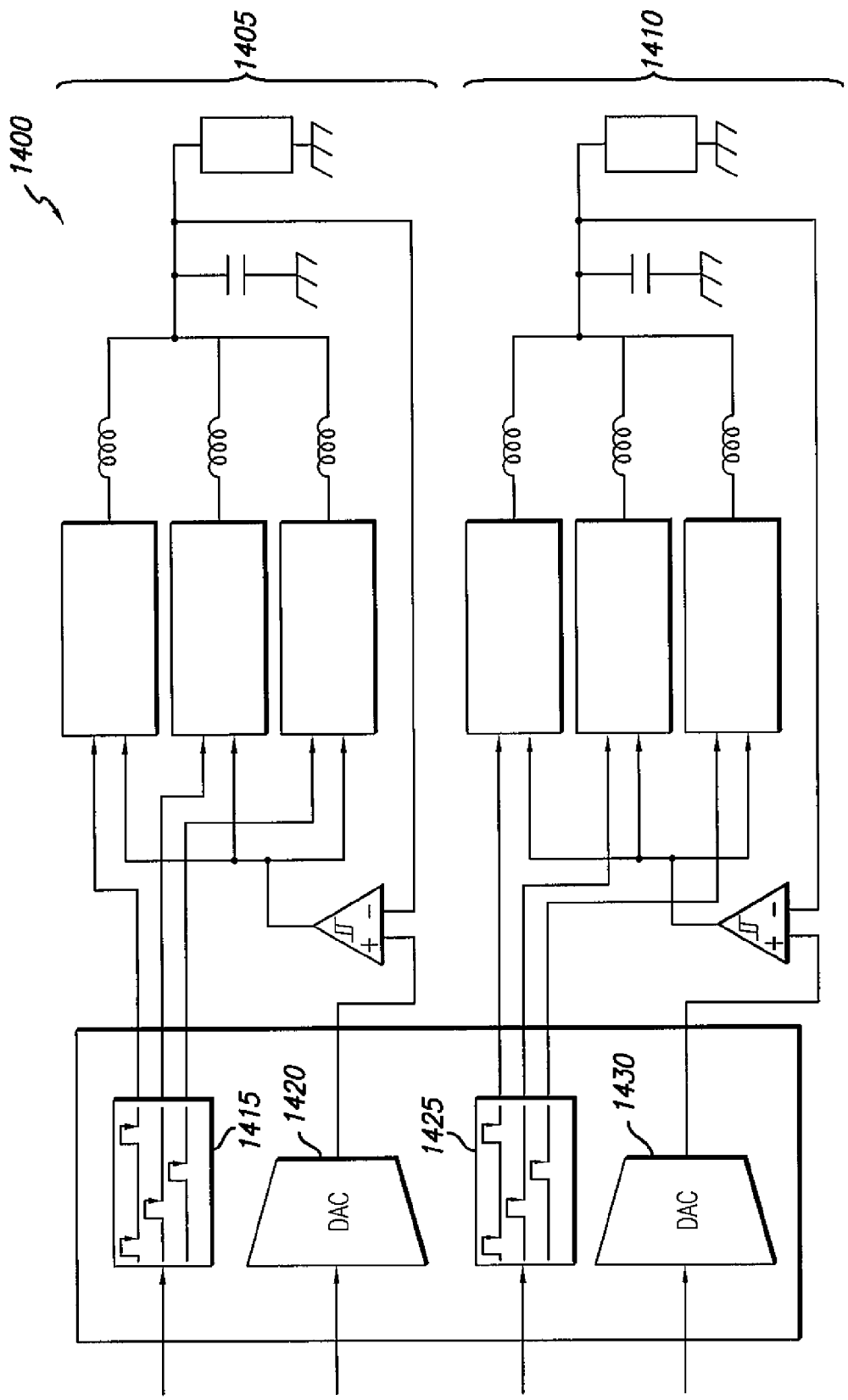
FIG. 14 is a block diagram illustrating two independent 3-phase voltage regulators, in accordance with an embodiment of the present invention.

FIG. 14 is a block diagram illustrating a system 1400 with two independent 3-phase voltage regulators 1405 and 1410, in accordance with an embodiment of the present invention. Using an MCU 1415 with two built-in DACs 1420 and 1430 and two built-in counters 1415 and 1425, the system 1400 can be easily modified from a single multiphase voltage regulator to two independent multiphase voltage regulators. While this system 1400 illustrates the 3-3 case, one skilled in the art will now recognize that other cases, e.g., 1-5, 2-4, 2-2-2, and the like are also possible.

Figure 15A:
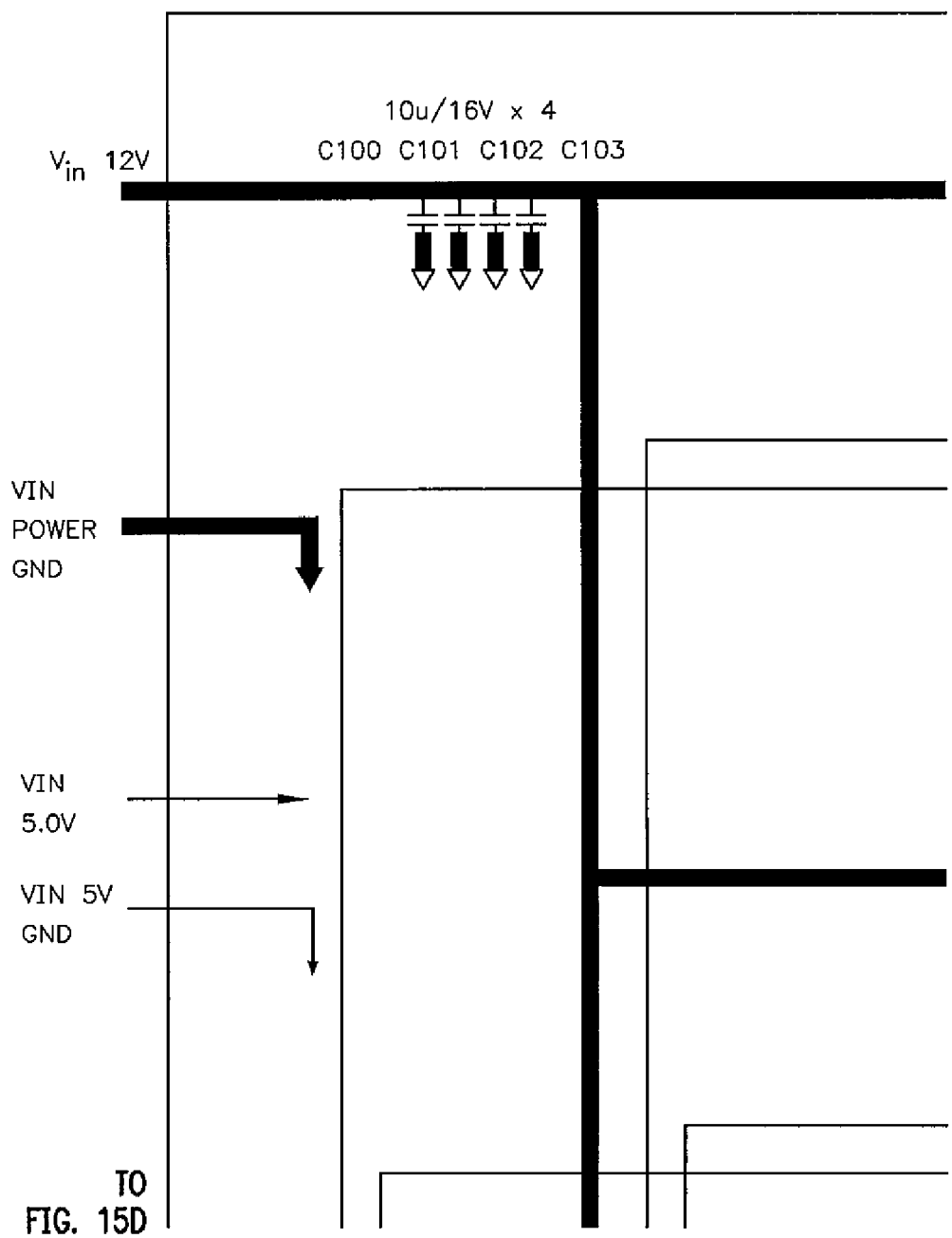
FIGS. 15*a*-15*i* together constitute a schematic diagram illustrating details of one implementation of a scalable voltage regulator module, in accordance with an embodiment of the present invention.
Figure 15B:
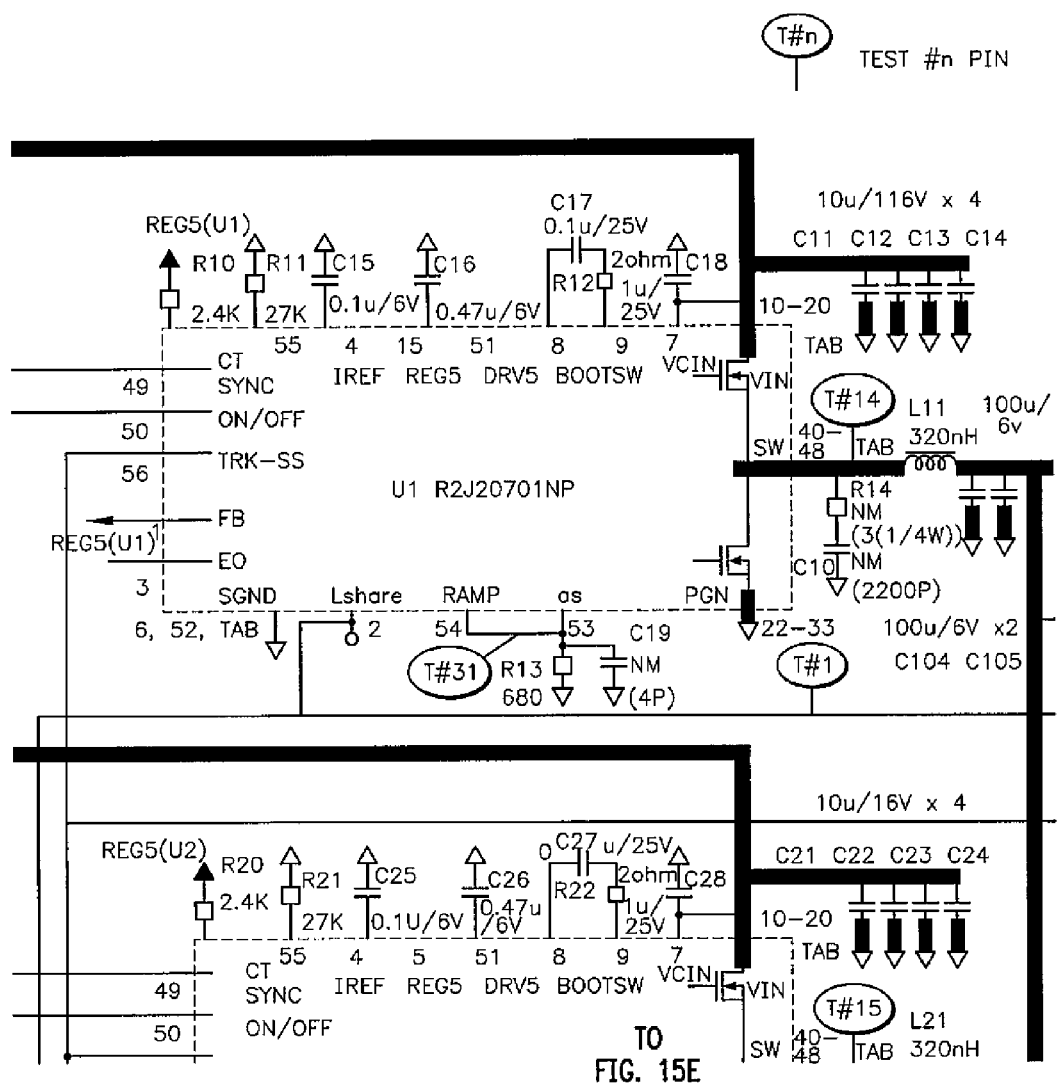
Figure 15C:
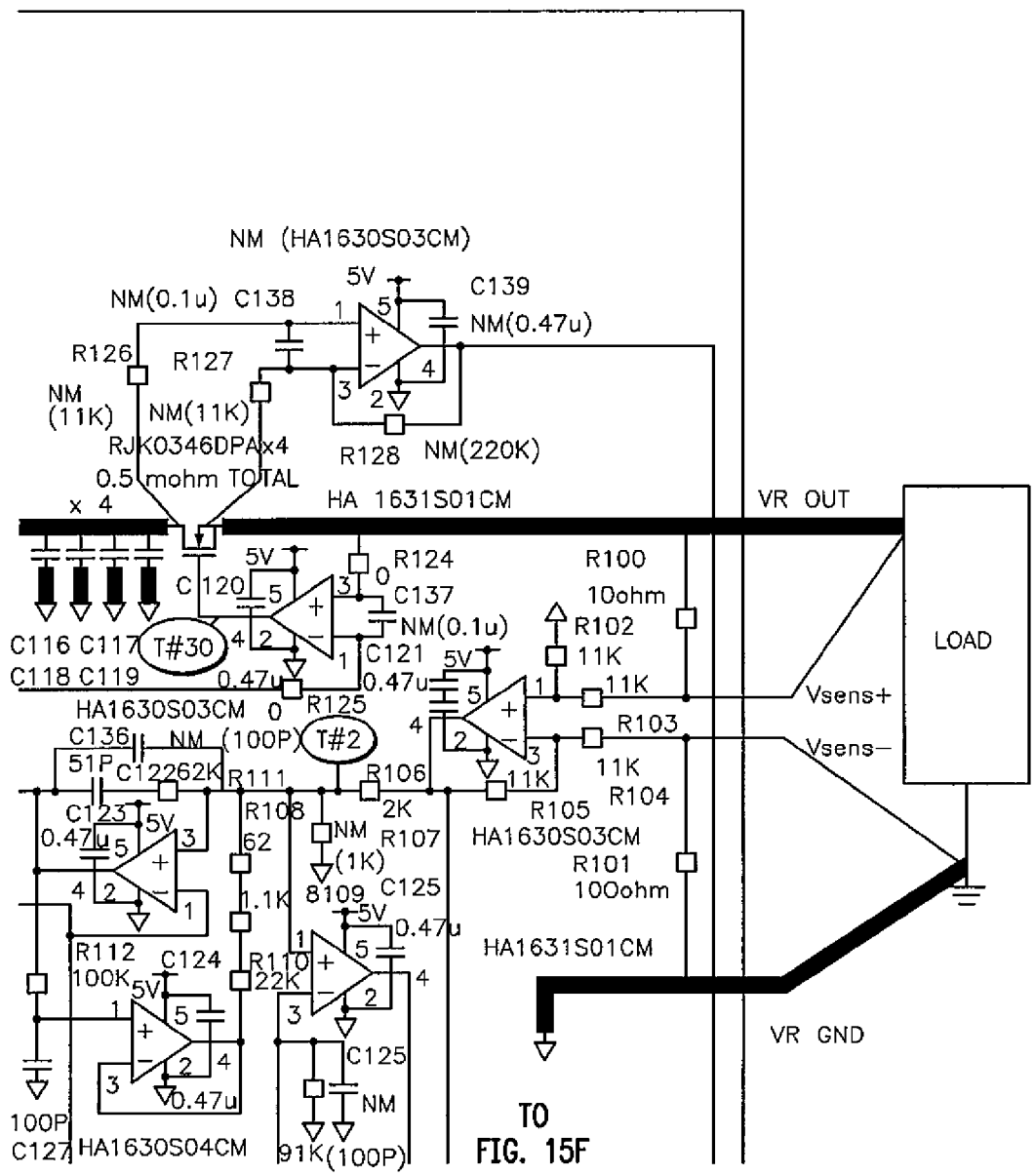
Figure 15D:
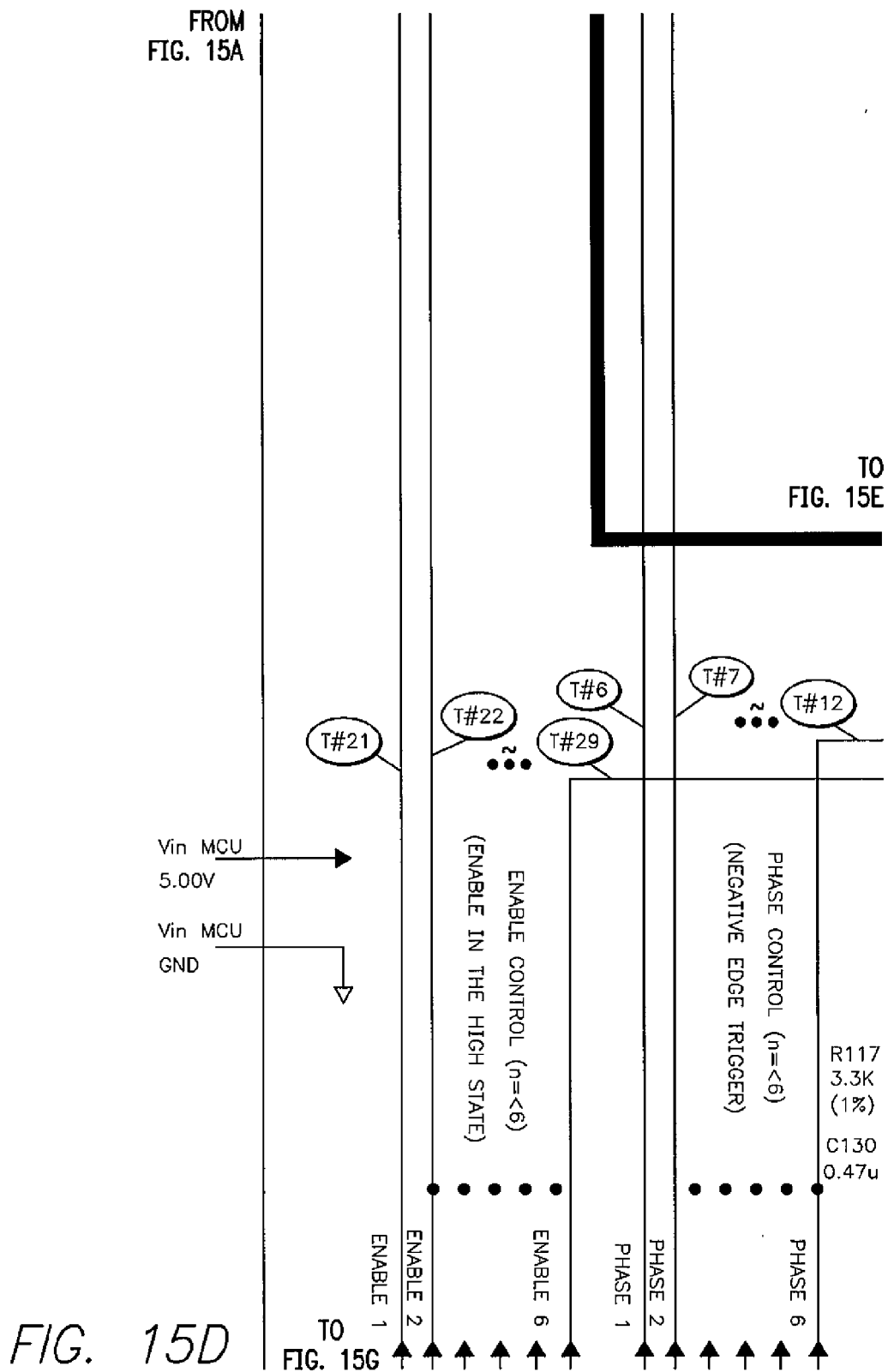
Figure 15E:
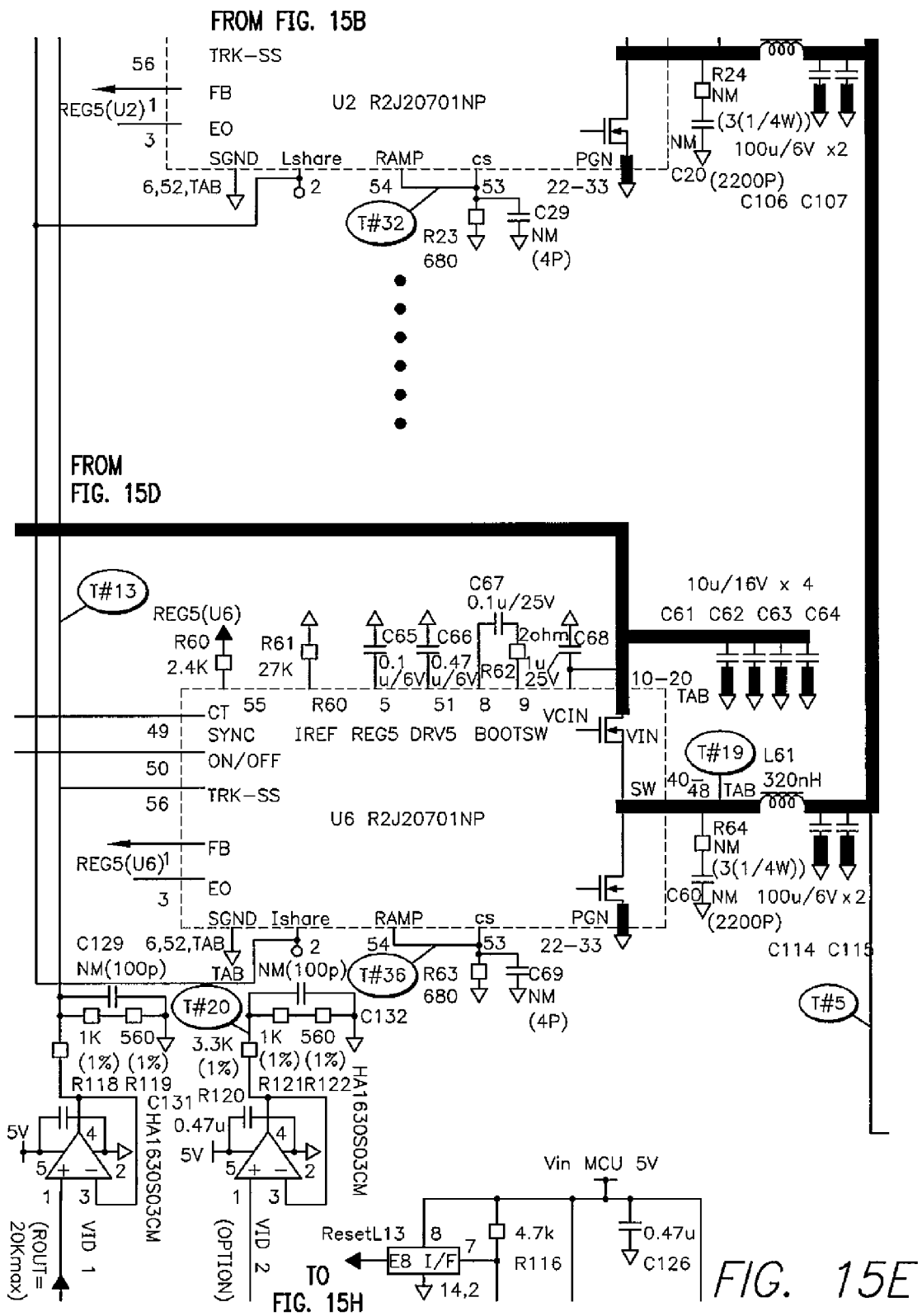
Figure 15F:
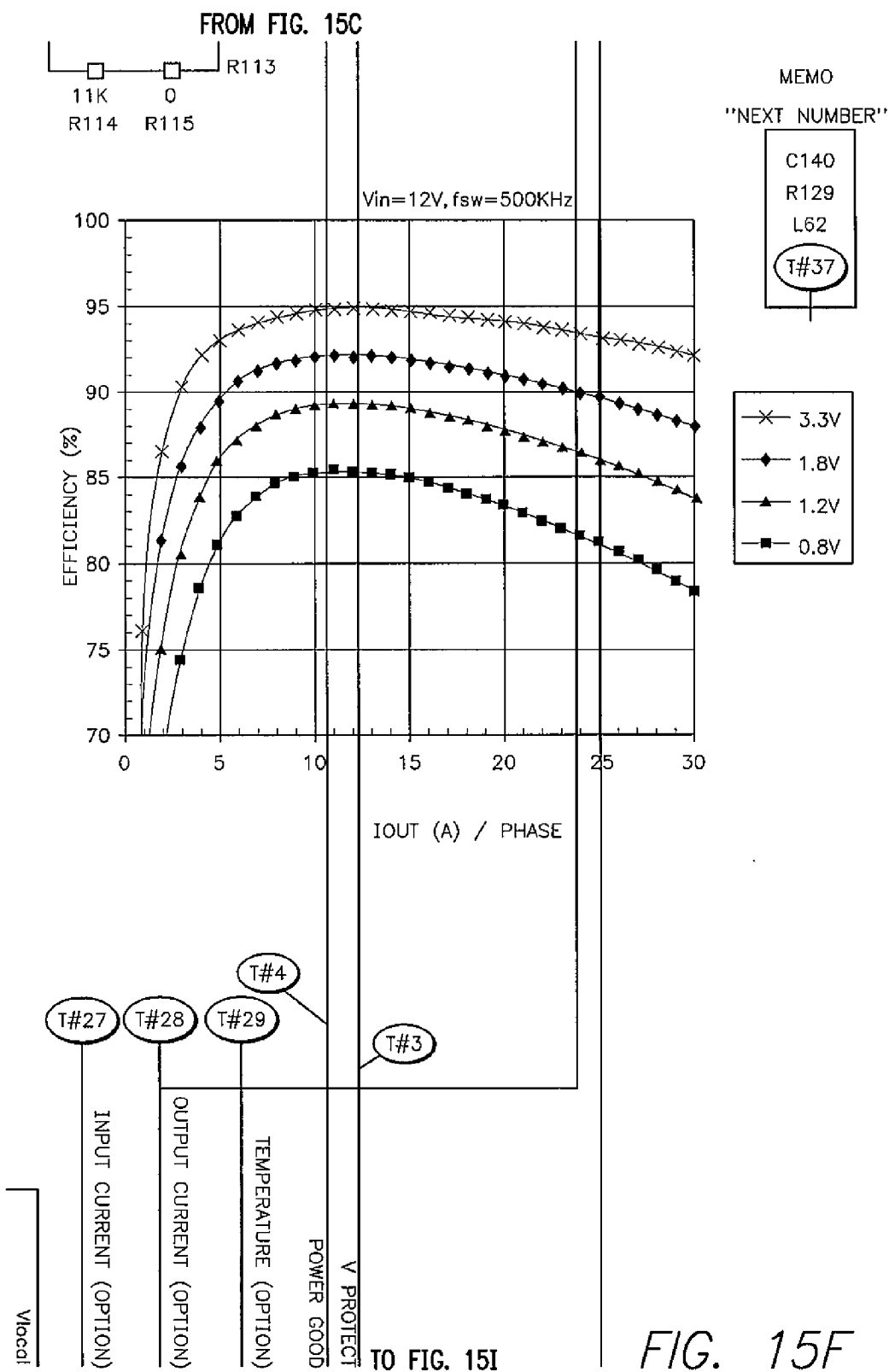
Figure 15G:
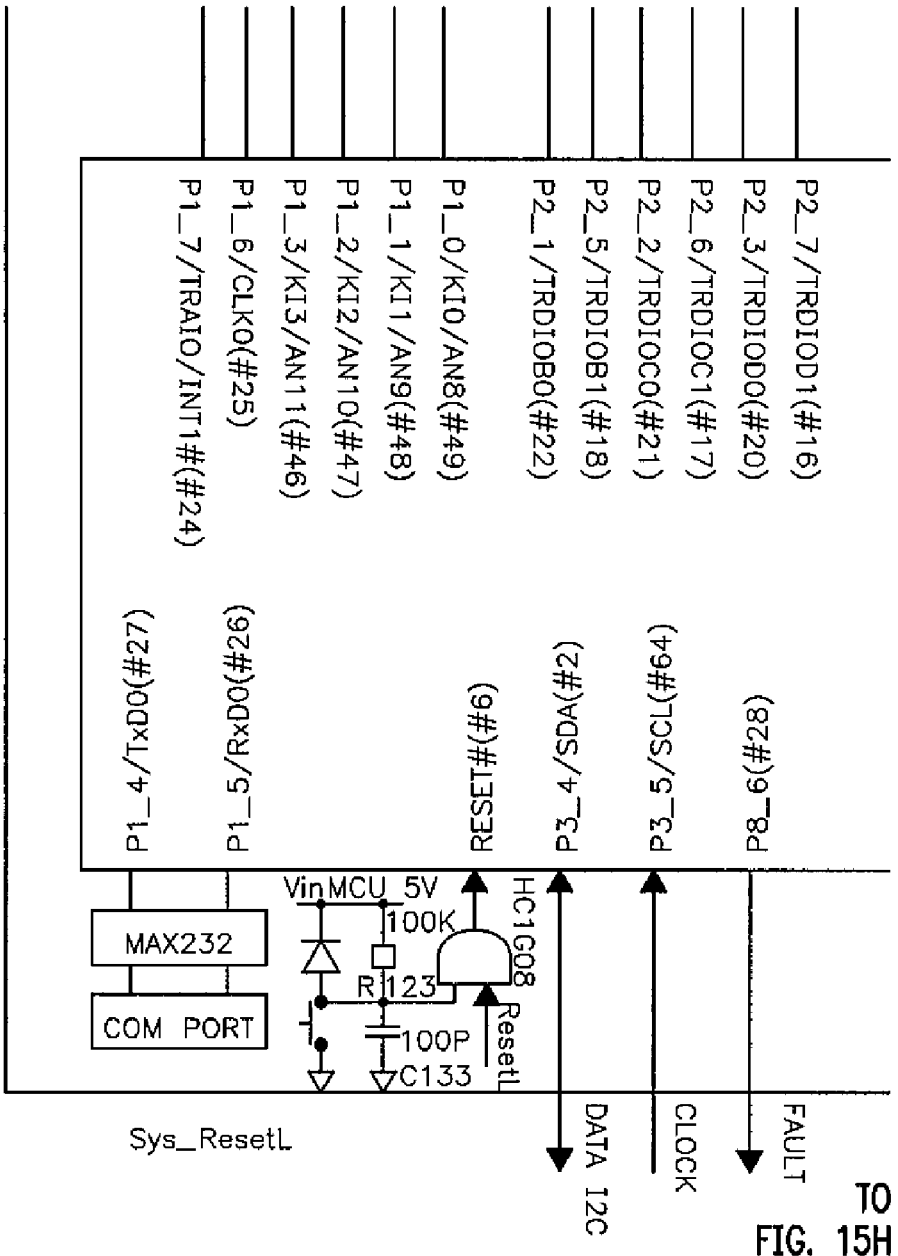
Figure 15H:
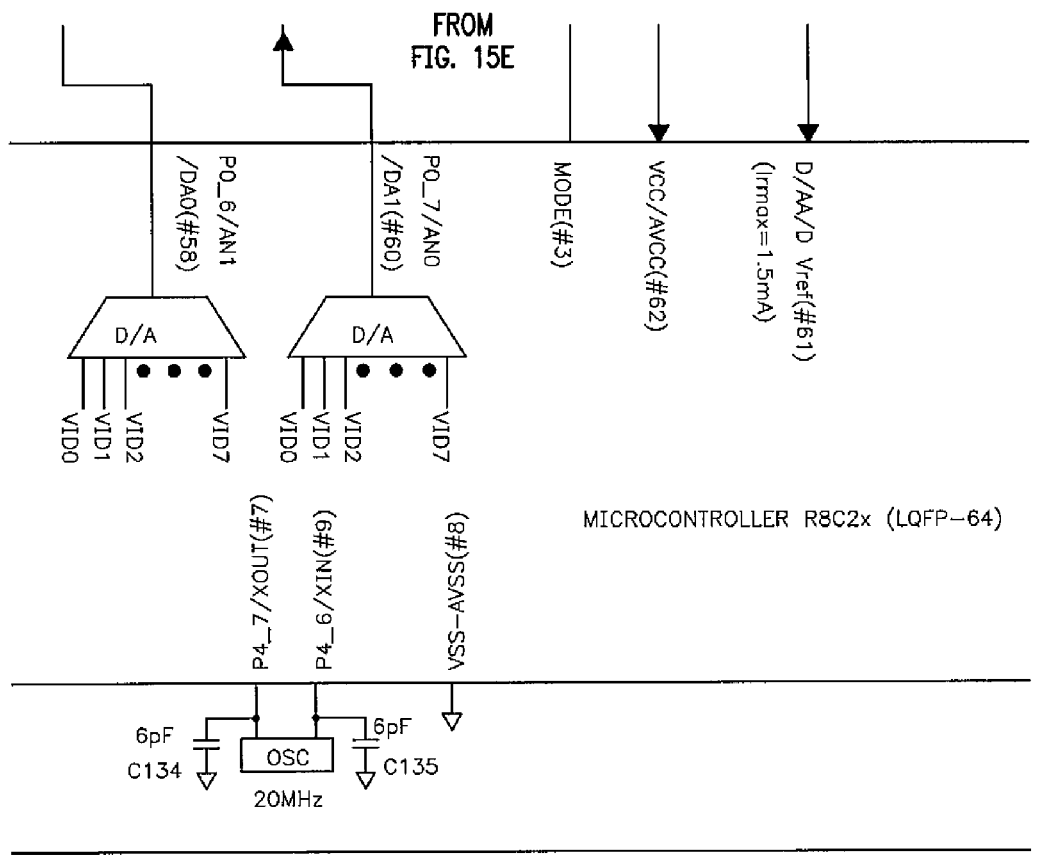
Figure 15I:
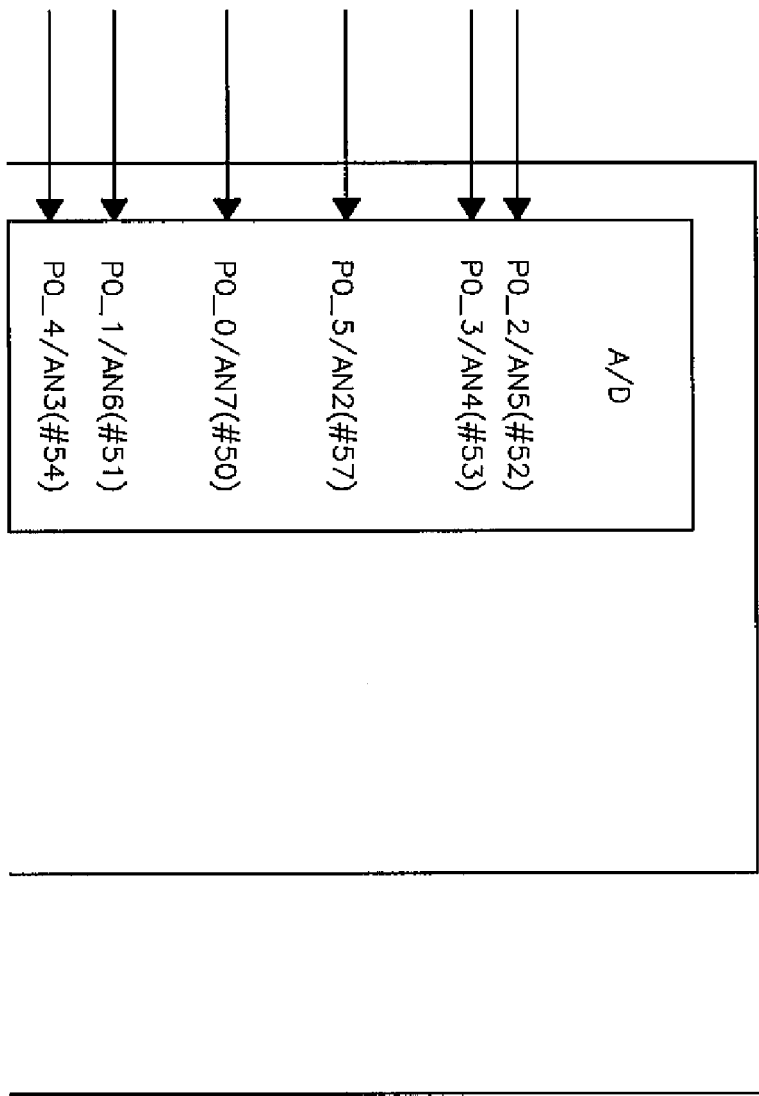

FIGS. 15a-15i together constitute a schematic diagram illustrating details of one implementation of a scalable voltage regulator module 1500. FIG. 15a is the top left portion of the schematic, FIG. 15b is the top center portion of the schematic, FIG. 15c is the top right portion of the schematic, FIG. 15d is the middle left portion of the schematic, FIG. 15e is the middle center portion of the schematic, FIG. 15f is the middle right portion of the schematic, FIG. 15g is the bottom left portion of the schematic, FIG. 15h is the bottom center portion of the schematic and FIG. 15i is the bottom right portion of the schematic.

Using high-side and low-side MOSFETs integrated in a point of load can eliminate stray components between the current driver and MOSFETs to achieve even better efficiency.

One embodiment enables easy to control phase down either one phase cycle time constant (ripple current constant), total PWM frequency constant (output ripple voltage constant) or in between. This enables easy to achieve high efficiency in light load modes.

One embodiment achieves a flexible scalable system. If voltage regulator specifications, e.g., Vin, Vout, Iomax, phase, f(PWM), etc., need to change, software control enables the modification with minimal hardware changes.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A multiphase voltage regulator system, comprising:
a microcontroller unit (MCU) including
a digital to analog converter (DAC) for generating a reference voltage; and
a timing generator for generating n-phase start timing signals;
a comparator for comparing the reference voltage and the output voltage to generate a comparison result; and
at least n points of load (POLs) coupled between the MCU and a load for controlling the output voltage in response to the n-phase start timing signals and the comparison result, wherein each POL includes a high-side transistor, a low-side transistor, and a driver for driving the transistors, and wherein the driver includes a D-FlipFlop having a D terminal, a clock terminal, a Q terminal, a /Q terminal and a reset terminal, the D terminal coupled High, the clock terminal coupled to receive a control signal based on a respective one of the n-phase start timing signals, the Q terminal coupled to drive the high-side transistor, the /Q terminal coupled to drive the low-side transistor, and the reset terminal coupled to receive a reset control signal based on the comparison result.

2. The system of claim 1, wherein each POL includes enable circuitry to deactivate and isolate the POL.

3. The system of claim 2, wherein the MCU includes an enable line coupled to the enable circuitry to control activation of each POL.

4. The system of claim 3, wherein the timing generator changes the phase of the n-phase start timing signals and maintains the cycle time of the n-phase start timing signals constant regardless of the number of active phases.

5. The system of claim 3, wherein the timing generator changes the phase of the n-phase start timing signals and modifies the cycle time of the n-phase start timing signals based on the number of active phases.

6. The system of claim 1, wherein the DAC changes the reference voltage in steps.

7. The system of claim 1, wherein
the MCU further includes a second DAC for generating a second reference voltage, the MCU being capable of generating y-phase start timing signals; and
the system further includes
a second comparator for comparing the second reference voltage and the second output voltage to generate a second comparison result; and
at least y second points of load coupled between the MCU and a second load for controlling the second output voltage in response to the y-phase start timing signals and the second comparison result.

8. The system of claim 1, wherein the MCU includes an analog to digital converter (ADC) to detect output current.

9. The system of claim 1, wherein the MCU includes an analog to digital converter (ADC) to detect load temperature.

10. The system of claim 1, wherein the comparator is an amplifier.

11. The system of claim 1, wherein the comparator is a subtraction amplifier.

12. A multiphase voltage regulator system, comprising:
a microcontroller unit (MCU) including
a register for storing a digital reference voltage value;
an analog to digital converter (ADC) for converting an output voltage to a digital output voltage value;
a digital comparator for comparing the digital reference voltage value and the digital output voltage value to generate a comparison result; and
a timing generator for generating n-phase start timing signals; and
at least n points of load (POLs) coupled between the MCU and a load for controlling the output voltage in response to the n-phase start timing signals and the comparison result, wherein each POL includes enable circuitry to deactivate the POL.

13. The system of claim 12, wherein the MCU includes an enable line coupled to the enable circuitry of each POL to control activation of each POL.

14. The system of claim 13, wherein the MCU is designed to disable at least one POL and enable the remaining POLs.

15. The system of claim 12, wherein the reference register is operative to modify the reference voltage value in steps.

16. The system of claim 12, further includes
the system a second load for receiving a second output voltage; the MCU further includes
a second digital reference voltage value,
a second ADC for converting the second output voltage to a second digital output voltage value,
a second digital comparator for comparing the second digital reference voltage value and the second digital output voltage value to generate a second comparison result, and
a second timing generator for generating y-phase start timing signals; and
the system further includes at least y second points of load coupled between the MCU and the second load for controlling the second output voltage in response to the y-phase start timing signals and the second comparison result.

17. The system of claim 12, wherein the MCU includes an analog to digital converter (ADC) to detect output current.

18. The system of claim 12, wherein the MCU includes an analog to digital converter (ADC) to detect load temperature.

19. A method comprising:
generating a reference voltage with a microcontroller unit (MCU);
generating n-phase start timing signals with the MCU;
receiving an output voltage at a load;
comparing the reference voltage and the output voltage to generate a comparison result;
using the n-phase start timing signals to drive n points of load (POLs) in a phase-shifted manner, each POL driving the output voltage in a first direction based on the n-phase start timing signals;
using the comparison result to drive the n POLs in a phase-shifted manner, each POL driving the output voltage in a second direction based on the comparison result, thereby generating a multiphase voltage-regulated signal to control the output voltage;
enabling n POLs; and
disabling at least one POL.

20. The method of claim 19, wherein the phase shift is approximately $2\pi/n$.

21. The method of claim 19, wherein the first direction includes upward and the second direction includes downward.

22. The method of claim 19, wherein the reference voltage is generated using a digital to analog converter (DAC).

23. The method of claim 19, wherein the n-phase start timing signals are generated using a counter.

24. The method of claim 19, wherein the step of comparing includes subtracting the output voltage from the reference voltage to generate a comparison result.

25. A multiphase voltage regulator system, comprising:
a microcontroller unit (MCU) including
a digital to analog converter (DAC) for generating a reference voltage; and
a timing generator for generating n-phase start timing signals;
a comparator for comparing the reference voltage and the output voltage to generate a comparison result; and
at least n points of load (POLs) coupled between the MCU and the load for controlling the output voltage in response to the n-phase start timing signals and the comparison result, wherein each POL includes enable circuitry to deactivate and isolate the POL.

26. The system of claim 25, wherein the MCU includes an enable line coupled to the enable circuitry of each POL to control activation of each POL.

27. The system of claim 26, wherein the MCU is designed to disable at least one POL and enable the remaining POLs.

28. The system of claim 25,
wherein each POL includes a high-side transistor, a low-side transistor, and a driver for driving the transistors, and
wherein the driver includes a D-FlipFlop having a D terminal, a clock terminal, a Q terminal, a /Q terminal and a reset terminal, the D terminal coupled High, the clock terminal coupled to receive a control signal based on a respective one of the n-phase start timing signals, the Q terminal coupled to drive the high-side transistor, the /Q terminal coupled to drive the low-side transistor, and the reset terminal coupled to receive a reset control signal based on the comparison result.

29. The system of claim 28, wherein the timing generator changes the phase of the n-phase start timing signals and maintains the cycle time of the n-phase start timing signals constant regardless of the number of active phases.

30. The system of claim 28, wherein the timing generator changes the phase of the n-phase start timing signals and modifies the cycle time of the n-phase start timing signals based on the number of active phases.

31. The system of claim 25, wherein
the MCU further includes a second DAC for generating a second reference voltage, the MCU being capable of generating y-phase start timing signals; and
the system further includes
 a second load for receiving a second output voltage;
 a second comparator for comparing the second reference voltage and the second output voltage to generate a second comparison result; and
 at least y second points of load coupled between the MCU and the second load for controlling the second output voltage in response to the y-phase start timing signals and the second comparison result.

32. The system of claim 1, wherein the comparator is an amplifier.

* * * * *